(12) United States Patent
Chou et al.

(10) Patent No.: US 8,264,920 B1
(45) Date of Patent: Sep. 11, 2012

(54) NEAR-FIELD LIGHT GENERATOR AND THERMALLY-ASSISTED MAGNETIC RECORDING HEAD

(75) Inventors: Tsutomu Chou, Tokyo (JP); Eiji Komura, Tokyo (JP); Shinji Hara, Tokyo (JP); Daisuke Miyauchi, Tokyo (JP); Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/191,913

(22) Filed: Jul. 27, 2011

(51) Int. Cl.
*G11B 11/00* (2006.01)
*G11B 7/135* (2006.01)

(52) U.S. Cl. .......... 369/13.33; 369/112.27; 369/112.09; 369/112.14

(58) Field of Classification Search .................. None
See application file for complete search history.

(56) References Cited

U.S. PATENT DOCUMENTS

| | | | |
|---|---|---|---|
| 7,330,404 B2 | 2/2008 | Peng et al. | |
| 8,077,559 B1 * | 12/2011 | Miyauchi et al. | 369/13.33 |
| 2010/0260015 A1 | 10/2010 | Sasaki et al. | |
| 2011/0058272 A1 | 3/2011 | Miyauchi et al. | |
| 2011/0216635 A1 * | 9/2011 | Matsumoto | 369/13.33 |

OTHER PUBLICATIONS

U.S. Appl. No. 13/097,133, filed Apr. 29, 2011, in the name of Miyauchi et al.
U.S. Appl. No. 13/405,893, filed Feb. 27, 2012, in the name of Aoki et al.

* cited by examiner

*Primary Examiner* — Joseph Feild
*Assistant Examiner* — Parul Gupta
(74) *Attorney, Agent, or Firm* — Oliff & Berridge, PLC

(57) ABSTRACT

A near-field light generator includes a waveguide, a plasmon generator, and a metal layer. The waveguide includes a core having an evanescent light generating surface. The plasmon generator includes a base part, and a protruding part that protrudes from the base part toward the evanescent light generating surface. The protruding part has: a front end face located at an end in a direction parallel to the evanescent light generating surface; a band-shaped flat surface facing toward the evanescent light generating surface; and two side surfaces connected to the flat surface. In at least a portion of the protruding part, the distance between the two side surfaces increases with increasing distance from the evanescent light generating surface. The flat surface includes a first portion contiguous with the front end face, and a second portion that is located farther from the front end face than is the first portion. The metal layer has an end face facing the first portion. The evanescent light generating surface faces the second portion.

8 Claims, 18 Drawing Sheets

NEAR-FIELD LIGHT GENERATOR AND THERMALLY-ASSISTED MAGNETIC RECORDING HEAD

BACKGROUND OF THE INVENTION

1. Field of the Invention

The present invention relates to a near-field light generator including a waveguide and a plasmon generator, and to a thermally-assisted magnetic recording head including the near-field light generator.

2. Description of the Related Art

Recently, magnetic recording devices such as magnetic disk drives have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, the thin-film magnetic head is mounted on a slider that flies slightly above the surface of the magnetic recording medium.

To increase the recording density of a magnetic recording device, it is effective to make the magnetic fine particles of the magnetic recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data writing with existing magnetic heads.

To solve the aforementioned problems, there has been proposed a technology so-called thermally-assisted magnetic recording. The technology uses a magnetic recording medium having high coercivity. When writing data, a write magnetic field and heat are simultaneously applied to the area of the magnetic recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the magnetic recording medium. A known method for generating near-field light is to use a plasmon generator, which is a piece of metal that generates near-field light from plasmons excited by irradiation with laser light. The laser light to be used for generating the near-field light is typically guided through a waveguide, which is provided in the slider, to the plasmon generator disposed near a medium facing surface of the slider.

The plasmon generator that generates near-field light by direct irradiation with light is known to exhibit very low efficiency of transformation of the applied light into near-field light. The energy of the light applied to the plasmon generator is mostly reflected off the surface of the plasmon generator, or transformed into thermal energy and absorbed by the plasmon generator. The plasmon generator is small in volume since the size of the plasmon generator is set to be smaller than or equal to the wavelength of the light. The plasmon generator therefore shows a significant increase in temperature when it absorbs the thermal energy.

Such an increase in temperature causes the plasmon generator to expand in volume and protrude from the medium facing surface. This increases the distance from the read head unit and the write head unit to the surface of the magnetic recording medium, thereby possibly causing degradation of the characteristics of the thermally-assisted magnetic recording head. Furthermore, an increase in temperature of the plasmon generator can degrade the magnetic property of a magnetic pole for producing a write magnetic field in the write head unit, and can thereby degrade the characteristics of the write head unit. These problems caused by an increase in temperature of the plasmon generator become prominent when the thermally-assisted magnetic recording head is used continuously for many hours.

To cope with this, there has been proposed such a technique that the surface of the core of the waveguide and the surface of the plasmon generator are arranged to face each other with a gap therebetween, so that evanescent light that occurs from the surface of the core based on the light propagating through the core is used to excite surface plasmons on the plasmon generator to generate near-field light based on the surface plasmons. The technique is disclosed in, for example, U.S. Pat. No. 7,330,404.

The aforementioned technique allows the light propagating through the core to be transformed into near-field light with high efficiency, and also allows the plasmon generator to be prevented from excessively increasing in temperature because the plasmon generator is not directly irradiated with the light propagating through the core.

Even with the aforementioned technique, however, an increase in temperature of the plasmon generator still occurs because part of the energy of the light propagating through the core is transformed into heat in the plasmon generator.

To increase the intensity of near-field light generated from the plasmon generator, it is required to increase the intensity of surface plasmons excited on the plasmon generator. As the intensity of surface plasmons excited on the plasmon generator increases, the amount of energy transformed into heat in the plasmon generator increases, and the problems resulting from an increase in temperature of the plasmon generator thus become more significant.

Conventionally, it has therefore been difficult to increase the intensity of near-field light generated from the plasmon generator while preventing an increase in temperature of the plasmon generator.

OBJECT AND SUMMARY OF THE INVENTION

It is an object of the present invention to provide a near-field light generator and a thermally-assisted magnetic recording head that are capable of increasing the intensity of near-field light generated from a plasmon generator and also preventing an increase in temperature of the plasmon generator, and to provide a head gimbal assembly and a magnetic recording device that each include the thermally-assisted magnetic recording head.

A near-field light generator of the present invention includes a waveguide, a plasmon generator, and a metal layer. The waveguide includes a core through which light propagates, and a cladding that surrounds the core. The core has an evanescent light generating surface that generates evanescent light based on the light propagating through the core. The core and the metal layer are located on the same side relative to the plasmon generator in a first direction perpendicular to the evanescent light generating surface.

The plasmon generator includes a base part, and a protruding part that protrudes from the base part toward the evanescent light generating surface. The base part has a first base surface and a second base surface that face toward the evanescent light generating surface and are located on opposite sides of the protruding part in a second direction parallel to the evanescent light generating surface. The first and second base surfaces are parallel to the evanescent light generating surface.

The protruding part has: a front end face located at an end in a third direction orthogonal to the first and second directions; a flat surface that is shaped like a band and elongated in the third direction, the flat surface facing toward the evanescent light generating surface and being parallel to the evanescent light generating surface; and a first side surface and a second side surface that are at a distance from each other. The flat surface is located closer to the evanescent light generating surface than are the first and second base surfaces. The first side surface connects the flat surface to the first base surface. The second side surface connects the flat surface to the second base surface. In at least a portion of the protruding part, the distance between the first and second side surfaces in the second direction increases with increasing distance from the evanescent light generating surface.

The front end face includes a near-field light generating part that generates near-field light. The flat surface includes a first portion contiguous with the front end face, and a second portion that is located farther from the front end face than is the first portion. The metal layer has an end face that faces the first portion of the flat surface. The evanescent light generating surface faces the second portion of the flat surface.

The difference in level between the flat surface and each of the first and second base surfaces in the first direction falls within the range of 20 to 50 nm. The flat surface has a width in the second direction within the range of 5 to 35 nm. The first portion of the flat surface and the end face of the metal layer are at a distance within the range of 10 to 40 nm from each other.

The near-field light generator of the present invention is configured so that a surface plasmon is excited on at least the second portion of the flat surface of the plasmon generator through coupling with the evanescent light generated from the evanescent light generating surface, the surface plasmon propagates along the flat surface to the near-field light generating part, and the near-field light generating part generates near-field light based on the surface plasmon.

According to the near-field light generator of the present invention, the base part in the plasmon generator serves as a heat sink for dissipating heat from the plasmon generator to the outside. Furthermore, the shape of the plasmon generator and the positional relationship between the core, the plasmon generator, and the metal layer defined as above cause a intense electric field to occur at the first portion of the flat surface of the protruding part of the plasmon generator.

In the near-field light generator of the present invention, each of the first and second side surfaces of the protruding part of the plasmon generator may form an angle with respect to the first direction, the angle increasing with increasing distance from the evanescent light generating surface.

A thermally-assisted magnetic recording head includes: a medium facing surface that faces a magnetic recording medium; a magnetic pole that has an end face located in the medium facing surface and produces a write magnetic field for writing data on the magnetic recording medium; and the near-field light generator of the present invention. The near-field light generating part in the front end face of the protruding part of the near-field light generator is located in the medium facing surface. The near-field light generator generates near-field light to irradiate the magnetic recording medium when data is written on the magnetic recording medium using the write magnetic field.

In the thermally-assisted magnetic recording head of the present invention, the magnetic pole may be disposed such that the plasmon generator is interposed between the metal layer and the magnetic pole. Alternatively, the magnetic pole and the metal layer may be located on the same side in the first direction relative to the plasmon generator. Alternatively, the magnetic pole may also serve as the metal layer.

A head gimbal assembly of the present invention includes the thermally-assisted magnetic recording head of the present invention, and a suspension that supports the thermally-assisted magnetic recording head. A magnetic recording device of the present invention includes a magnetic recording medium, the thermally-assisted magnetic recording head of the present invention, and a positioning device that supports the thermally-assisted magnetic recording head and positions the same with respect to the magnetic recording medium.

According to the near-field light generator, the thermally-assisted magnetic recording head, the head gimbal assembly, and the magnetic recording device of the present invention, as described above, in the plasmon generator the base part serves as a heat sink and an intense electric field occurs at the first portion of the flat surface of the protruding part. According to the present invention, it is thus possible to increase the intensity of near-field light generated from the plasmon generator and to prevent an increase in temperature of the plasmon generator.

Other and further objects, features and advantages of the present invention will appear more fully from the following description.

DETAILED DESCRIPTION OF THE PREFERRED EMBODIMENTS

First Embodiment

Figure 6:
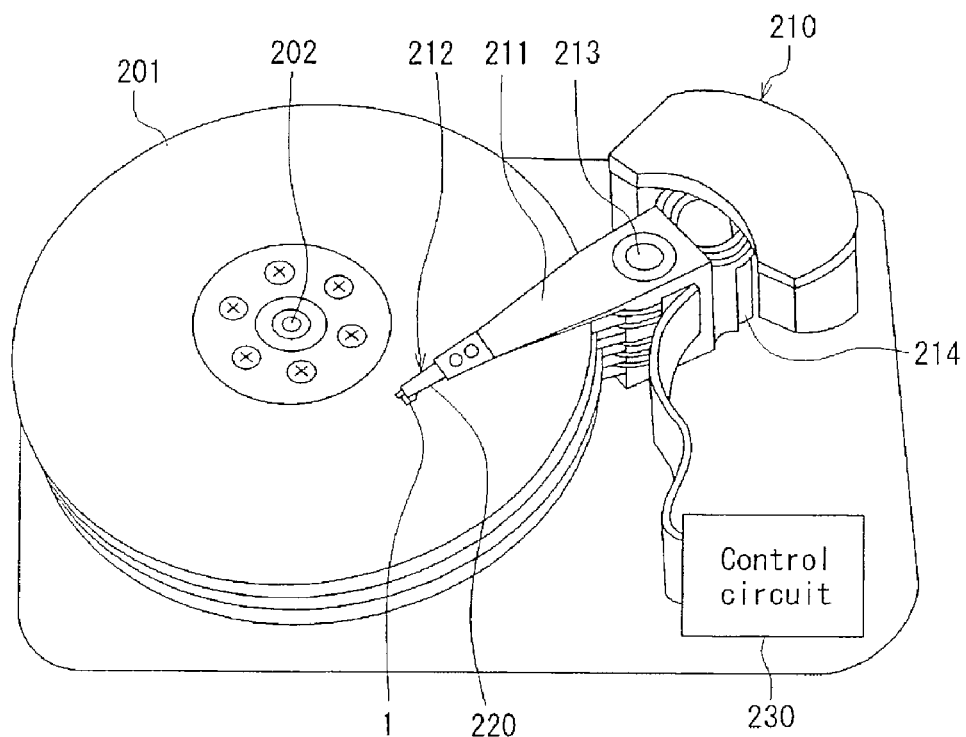
FIG. 6 is a perspective view showing a magnetic recording device according to the first embodiment of the invention.

Preferred embodiments of the present invention will now be described in detail with reference to the drawings. First, reference is made to FIG. 6 to describe a magnetic disk drive that functions as a magnetic recording device according to a first embodiment of the invention. As shown in FIG. 6, the magnetic disk drive includes a plurality of magnetic disks 201 as a plurality of magnetic recording media, and a spindle motor 202 for rotating the magnetic disks 201. The magnetic disks 201 of the present embodiment are for use in perpendicular magnetic recording. Each magnetic disk 201 has such a structure that a soft magnetic backing layer, a middle layer, and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a thermally-assisted magnetic recording head 1 according to the present embodiment, and a suspension 220 that supports the thermally-assisted magnetic recording head 1.

The assembly carriage device 210 is a device for positioning each thermally-assisted magnetic recording head 1 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device of the present invention is not structurally limited to the magnetic disk drive having the above-described configuration. For example, the magnetic recording device of the present invention may be provided with a single magnetic disk 201, a single driving arm 211, a single head gimbal assembly 212 and a single thermally-assisted magnetic recording head 1.

The magnetic disk drive further includes a control circuit 230 that controls the read/write operations of the thermally-assisted magnetic recording heads 1 and also controls the light emitting operation of a laser diode serving as a light source for generating laser light for thermally-assisted magnetic recording described later.

Figure 7:
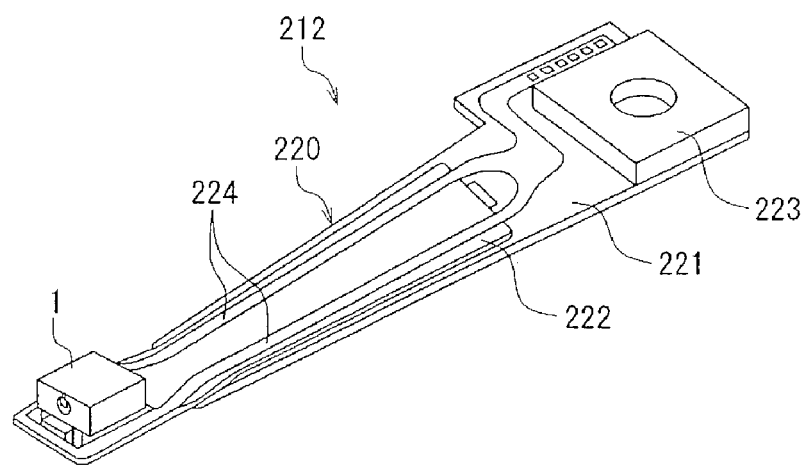
FIG. 7 is a perspective view showing a head gimbal assembly according to the first embodiment of the invention.

FIG. 7 is a perspective view showing the head gimbal assembly 212 of FIG. 6. As described above, the head gimbal assembly 212 includes the thermally-assisted magnetic recording head 1 and the suspension 220. The suspension 220 has a load beam 221, a flexure 222 secured to the load beam 221 and having flexibility, a base plate 223 provided at the base part of the load beam 221, and a wiring member 224 provided on the load beam 221 and the flexure 222. The wiring member 224 includes a plurality of leads. The thermally-assisted magnetic recording head 1 is secured to the flexure 222 at the distal end of the suspension 220 such that the head 1 faces the surface of the magnetic disk 201 with a predetermined spacing (flying height). One end of the wiring member 224 is electrically connected to a plurality of terminals of the thermally-assisted magnetic recording head 1. The other end of the wiring member 224 is provided with a plurality of pad-shaped terminals arranged at the base part of the load beam 221.

The assembly carriage device 210 and the suspension 220 correspond to the positioning device of the present invention. The head gimbal assembly of the present invention is not limited to one having the configuration shown in FIG. 7. For example, the head gimbal assembly of the present invention may have an IC chip for driving the head that is mounted somewhere along the suspension 220.

Figure 8:
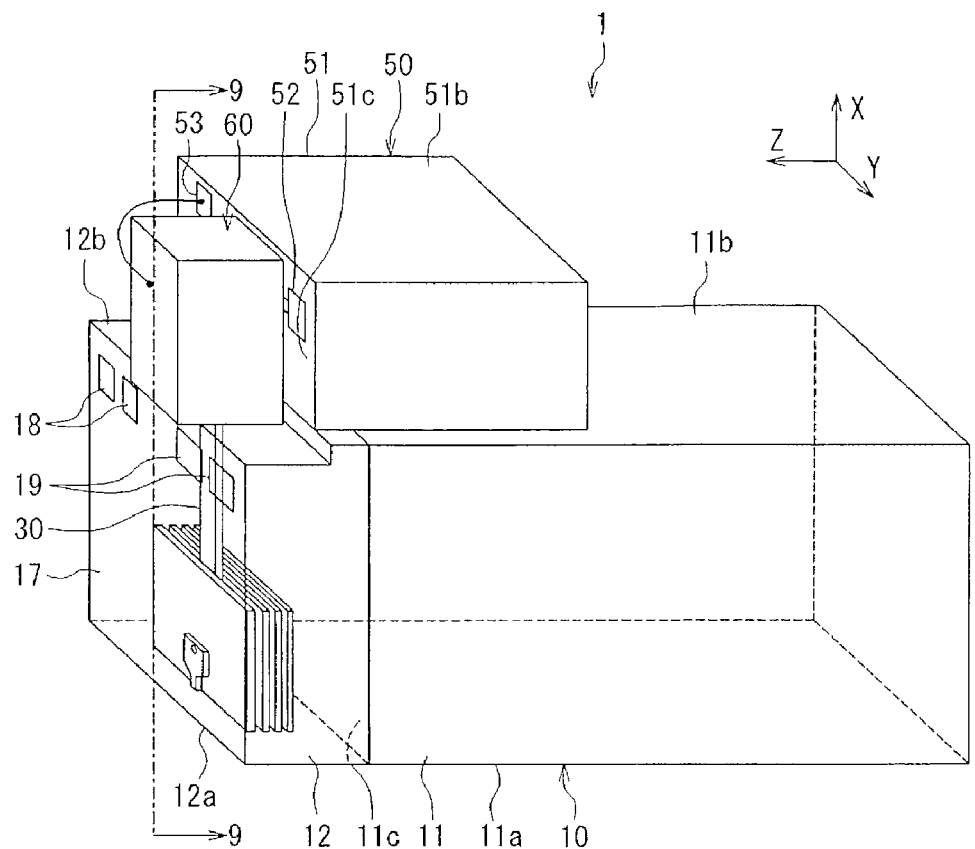
FIG. 8 is a perspective view showing the thermally-assisted magnetic recording head according to the first embodiment of the invention.
Figure 9:
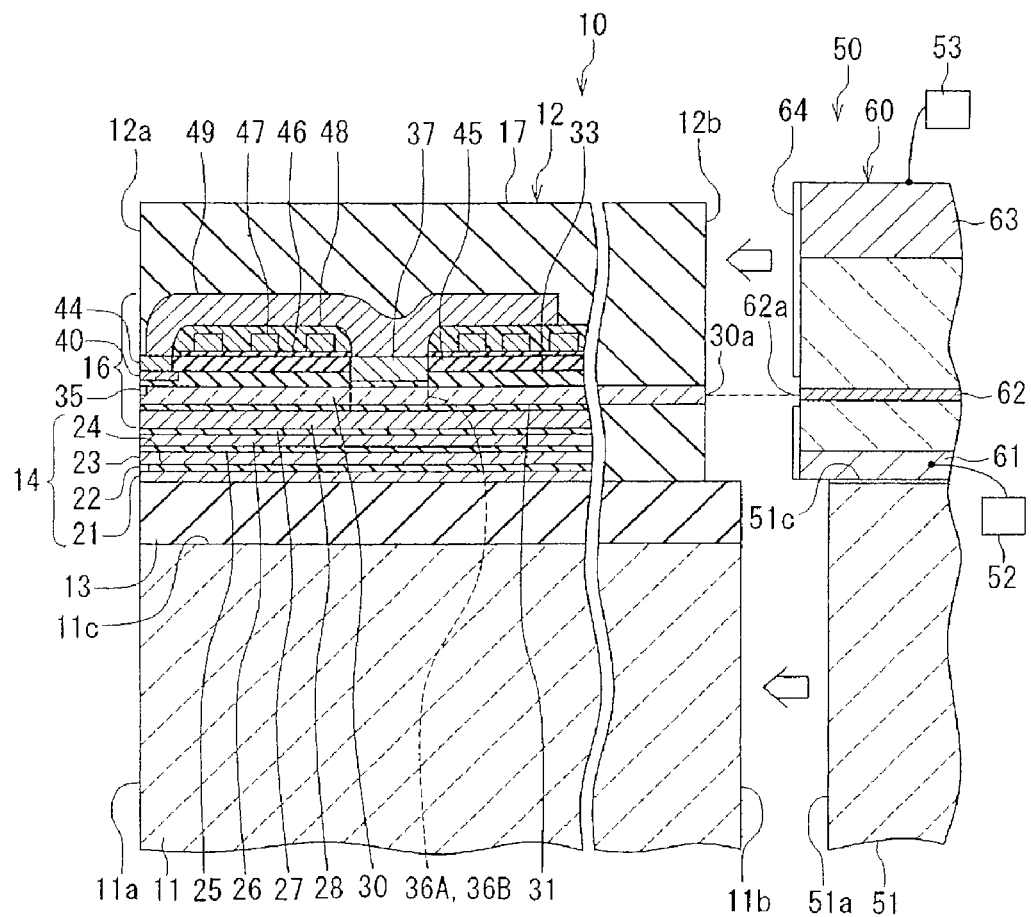
FIG. 9 shows a cross section taken along line 9-9 of FIG. 8.

The configuration of the thermally-assisted magnetic recording head 1 according to the present embodiment will now be described with reference to FIG. 8 and FIG. 9. FIG. 8 is a perspective view showing the thermally-assisted magnetic recording head 1. FIG. 9 shows a cross section taken along line 9-9 of FIG. 8. The thermally-assisted magnetic recording head 1 includes a slider 10 and a light source unit 50. FIG. 9 shows a state where the slider 10 and the light source unit 50 are separated from each other.

The slider 10 includes a slider substrate 11 and a head unit 12. The slider substrate 11 is in the shape of a rectangular solid and is made of a ceramic material such as aluminum oxide-titanium carbide ($Al_2O_3$—TiC). The slider substrate 11 has a medium facing surface 11a that faces the magnetic disk 201, a rear surface 11b opposite to the medium facing surface 11a, and four surfaces connecting the medium facing surface 11a to the rear surface 11b. One of the four surfaces connecting the medium facing surface 11a to the rear surface 11b is an element-forming surface 11c. The element-forming surface 11c is perpendicular to the medium facing surface 11a. The head unit 12 is disposed on the element-forming surface 11c. The medium facing surface 11a is processed so as to obtain an appropriate flying height of the slider 10 from the magnetic disk 201. The head unit 12 has a medium facing surface 12a that faces the magnetic disk 201, and a rear surface 12b opposite to the medium facing surface 12a. The medium facing surface 12a is parallel to the medium facing surface 11a of the slider substrate 11.

Where the components of the head unit 12 are concerned, with respect to a reference position, a position located in a direction that extends perpendicular to the element-forming surface 11c and away from the element-forming surface 11c is defined as "above", and a position located in a direction opposite to the aforementioned direction is defined as "below". Where the layers included in the head unit 12 are concerned, the surface closer to the element-forming surface 11c is defined as a "bottom surface," and the surface farther from the element-forming surface 11c as a "top surface."

Moreover, X direction, Y direction, Z direction, −X direction, −Y direction, and −Z direction will be defined as follows. The X direction is a direction perpendicular to the medium facing surface 11a and from the medium facing surface 11a to the rear surface 11b. The Y direction is a direction parallel to the medium facing surface 11a and the element-forming surface 11c and from the back side to the front side of FIG. 9. The Z direction is a direction that extends perpendicular to the element-forming surface 11c and away from the element-forming surface 11c. The −X direction, the −Y direction, and the −Z direction are opposite to the X direction, the Y direction, and the Z direction, respectively. As viewed from the slider 10, the magnetic disk 201 moves in the Z direction. The slider 10 has an air inflow end (a leading end) at the end of the medium facing surface 11a in the −Z direction. The slider 10 has an air outflow end (a trailing end) at the end of the medium facing surface 12a in the Z direction. Track width direction TW is parallel to the Y direction.

The light source unit 50 includes a laser diode 60 serving as a light source for emitting laser light, and a support member 51 that is in the shape of a rectangular solid and supports the laser diode 60. The support member 51 is made of, for example, a ceramic material such as aluminum oxide-titanium carbide ($Al_2O_3$—TiC). The support member 51 has a bond surface 51a, a rear surface 51b opposite to the bond surface 51a, and four surfaces connecting the bond surface 51a to the rear surface 51b. One of the four surfaces connecting the bond surface 51a to the rear surface 51b is a light source mount surface 51c. The bond surface 51a is the surface to be bonded to the rear surface 11b of the slider substrate 11. The light source mount surface 51c is perpendicular to the bond surface 51a and parallel to the element-forming surface 11c. The laser diode 60 is mounted on the light source mount surface 51c. The support member 51 may function as a heat sink for dissipating heat generated by the laser diode 60, as well as serving to support the laser diode 60.

As shown in FIG. 9, the head unit 12 includes an insulating layer 13 disposed on the element-forming surface 11c, and also includes a read head unit 14, a write head unit 16, and a protection layer 17 that are stacked in this order on the insulating layer 13. The insulating layer 13 and the protection layer 17 are each made of an insulating material such as $Al_2O_3$ (hereinafter, also referred to as alumina).

The read head unit 14 includes: a bottom shield layer 21 disposed on the insulating layer 13; an MR element 22 disposed on the bottom shield layer 21; a top shield layer 23 disposed on the MR element 22; and an insulating layer 24 disposed between the bottom shield layer 21 and the top shield layer 23 and surrounding the MR element 22. The bottom shield layer 21 and the top shield layer 23 are each made of a soft magnetic material. The insulating layer 24 is made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction generally parallel to the plane of layers constituting the GMR element or the current-perpendicular-to-plane (CPP) type in which the sense current is fed in a direction generally perpendicular to the plane of layers constituting the GMR element.

If the MR element 22 is a TMR element or a CPP-type GMR element, the bottom shield layer 21 and the top shield layer 23 may also serve as electrodes for feeding the sense current to the MR element 22. If the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head unit 12 further includes an insulating layer 25 disposed on the top shield layer 23, a middle shield layer 26 disposed on the insulating layer 25, and an insulating layer 27 disposed on the middle shield layer 26. The middle shield layer 26 functions to shield the MR element 22 from a magnetic field produced in the write head unit 16. The insulating layers 25 and 27 are each made of an insulating material such as alumina. The middle shield layer 26 is made of a soft magnetic material. The insulating layer 25 and the middle shield layer 26 may be omitted.

The write head unit 16 is for use in perpendicular magnetic recording. The write head unit 16 includes a return yoke layer 28 disposed on the insulating layer 27, and a not-shown insulating layer disposed on the insulating layer 27 and surrounding the return yoke layer 28. The return yoke layer 28 is made of a soft magnetic material. The top surfaces of the return yoke layer 28 and the not-shown insulating layer are even with each other.

Figure 4:
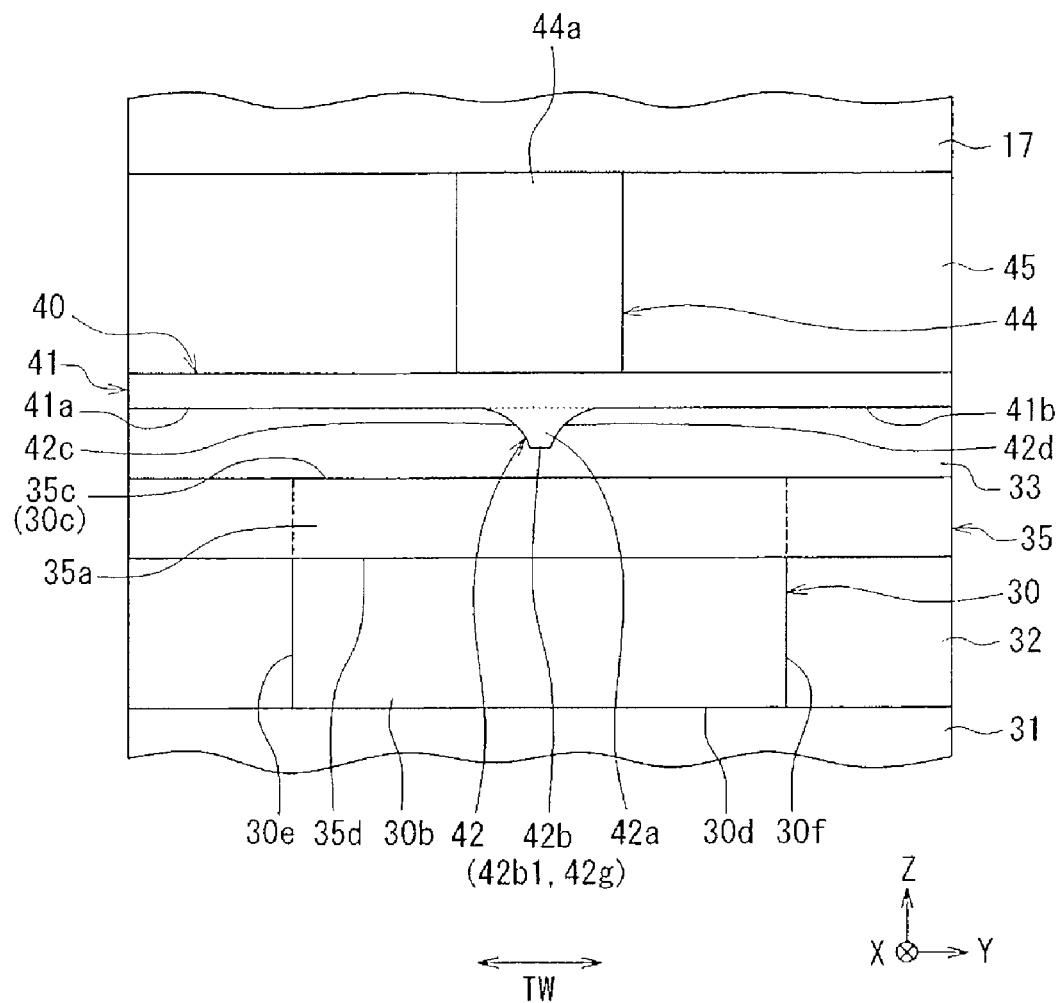
FIG. 4 is a front view showing the main part of the thermally-assisted magnetic recording head according to the first embodiment of the invention.

The write head unit 16 further includes a waveguide including a core 30 and a cladding. The cladding includes cladding layers 31, 32, and 33. The cladding layer 31 is disposed over the return yoke layer 28 and the not-shown insulating layer. The core 30 is disposed on the cladding layer 31. The cladding layer 32 is disposed on the cladding layer 31 and surrounds the core 30. The cladding layer 32 is not shown in FIG. 9 but is shown in FIG. 4, which will be described later. The cladding layer 33 is disposed over the core 30 and the cladding layer 32.

The core 30 extends in the direction perpendicular to the medium facing surface 12a (the X direction). The core 30 has an incidence end 30a, and a front end face opposite thereto. The core 30 propagates laser light that is emitted from the laser diode 60 and incident on the incidence end 30a.

The core 30 is made of a dielectric material that transmits the laser light. Each of the cladding layers 31, 32 and 33 is made of a dielectric material and has a refractive index lower than that of the core 30. For example, if the laser light has a wavelength of 600 nm and the core 30 is made of $Al_2O_3$ (refractive index n=1.63), the cladding layers 31, 32 and 33 may be made of $SiO_2$ (refractive index n=1.46). If the core 30 is made of tantalum oxide such as $Ta_2O_5$ (n=2.16), the cladding layers 31, 32 and 33 may be made of $SiO_2$ (n=1.46) or $Al_2O_3$ (n=1.63).

The write head unit 16 further includes: a metal layer 35 provided in the vicinity of the medium facing surface 12a such that a portion of the metal layer 35 is embedded in the core 30; a plasmon generator 40 disposed above the core 30 and the metal layer 35 in the vicinity of the medium facing surface 12a; and a magnetic pole 44 disposed such that the plasmon generator 40 is interposed between the metal layer 35 and the magnetic pole 44. The plasmon generator 40 is embedded in the cladding layer 33.

The plasmon generator 40 is made of a conductive material such as a metal. For example, the plasmon generator 40 may be made of one element selected from the group consisting of Au, Ag, Cu, and Al, or of an alloy composed of two or more of these elements. The metal layer 35 may be made of a metal the same as or different from that used for the plasmon generator 40. The magnetic pole 44 is made of a soft magnetic material, or a magnetic metal material in particular.

The near-field light generator according to the present embodiment includes the waveguide, the metal layer 35, and the plasmon generator 40. The shapes and the arrangement of the core 30 of the waveguide, the metal layer 35, the plasmon generator 40, and the magnetic pole 44 will be described in detail later.

The write head unit 16 further includes two coupling portions 36A and 36B embedded in the cladding layers 31, 32 and 33 at positions away from the medium facing surface 12a. The coupling portions 36A and 36B are made of a soft magnetic material. The coupling portions 36A and 36B are located on opposite sides of the core 30 in the track width direction TW, each being spaced from the core 30. The bottom surfaces of the coupling portions 36A and 36B are in contact with the top surface of the return yoke layer 28.

The write head unit 16 further includes a coupling layer 37 embedded in the cladding layer 33. The coupling layer 37 is made of a soft magnetic material. The coupling layer 37 is located above the core 30. The bottom surface of the coupling layer 37 is in contact with the top surfaces of the coupling portions 36A and 36B.

The write head unit 16 further includes: an insulating layer 45 disposed around the magnetic pole 44 and the coupling layer 37; an insulating layer 46 disposed on the insulating layer 45; a coil 47 disposed on the insulating layer 46; and an insulating layer 48 covering the coil 47. The coil 47 is planar spiral-shaped and wound around the coupling layer 37. The coil 47 produces a magnetic field corresponding to data to be written on the magnetic disk 201. The coil 47 is made of a conductive material such as copper.

The write head unit 16 further includes a yoke layer 49. The yoke layer 49 is disposed over the magnetic pole 44, the insulating layer 48 and the coupling layer 37. The yoke layer 49 is in contact with the top surface of the magnetic pole 44 at a position near the medium facing surface 12a, and in contact with the top surface of the coupling layer 37 at a position away from the medium facing surface 12a. The yoke layer 49 is made of a soft magnetic material.

In the write head unit 16, a magnetic path for passing a magnetic flux corresponding to the magnetic field produced by the coil 47 is formed by the return yoke layer 28, the coupling portions 36A and 36B, the coupling layer 37, the yoke layer 49, and the magnetic pole 44. The magnetic pole 44 has an end face located in the medium facing surface 12a, allows the magnetic flux corresponding to the magnetic field produced by the coil 47 to pass, and produces a write magnetic field for writing data on the magnetic disk 201 by means of the perpendicular magnetic recording system.

As shown in FIG. 9, the protection layer 17 is disposed to cover the write head unit 16. As shown in FIG. 8, the head unit 12 further includes a pair of terminals 18 that are disposed on the top surface of the protection layer 17 and electrically connected to the MR element 22, and another pair of terminals 19 that are disposed on the top surface of the protection layer 17 and electrically connected to the coil 47. These terminals 18 and 19 are electrically connected to the plurality of pad-shaped terminals of the wiring member 224 shown in FIG. 7.

The laser diode 60 may be a laser diode of InP type, GaAs type, GaN type or the like that is commonly used for such applications as communications, optical disc storage and material analysis. The laser diode 60 may emit laser light of any wavelength within the range of, for example, 375 nm to 1.7 μm. Specifically, the laser diode 60 may be an InGaAsP/InP quarternary mixed crystal laser diode having an emittable wavelength range of 1.2 to 1.67 μm, for example.

As shown in FIG. 9, the laser diode 60 has a multilayer structure including a lower electrode 61, an active layer 62, and an upper electrode 63. A reflecting layer 64 made of, for example, $SiO_2$ or $Al_2O_3$, is formed on two cleavage planes of the multilayer structure so as to excite oscillation by total reflection of light. The reflecting layer 64 has an opening for emitting laser light in the position of the active layer 62 including an emission center 62a.

The light source unit 50 further includes a terminal 52 disposed on the light source mount surface 51c and electrically connected to the lower electrode 61, and a terminal 53 disposed on the light source mount surface 51c and electrically connected to the upper electrode 63. These terminals 52 and 53 are electrically connected to the plurality of pad-shaped terminals of the wiring member 224 shown in FIG. 7. When a predetermined voltage is applied to the laser diode 60 through the terminals 52 and 53, laser light is emitted from the emission center 62a of the laser diode 60. The laser light emitted from the laser diode 60 is preferably TM-mode polarized light whose electric field oscillates in a direction perpendicular to the plane of the active layer 62.

The laser diode 60 can be driven by a power supply inside the magnetic disk drive. The magnetic disk drive usually includes a power supply that generates a voltage of 5 V or so, for example. This supply voltage is sufficient to drive the laser diode 60. The laser diode 60 has a power consumption of, for example, several tens of milliwatts or so, which can be adequately covered by the power supply in the magnetic disk drive.

The light source unit 50 is secured to the slider 10 by bonding the bond surface 51a of the support member 51 to the rear surface 11b of the slider substrate 11, as shown in FIG. 9. The laser diode 60 and the core 30 are positioned with respect to each other so that the laser light emitted from the laser diode 60 will be incident on the incidence end 30a of the core 30.

Figure 1:
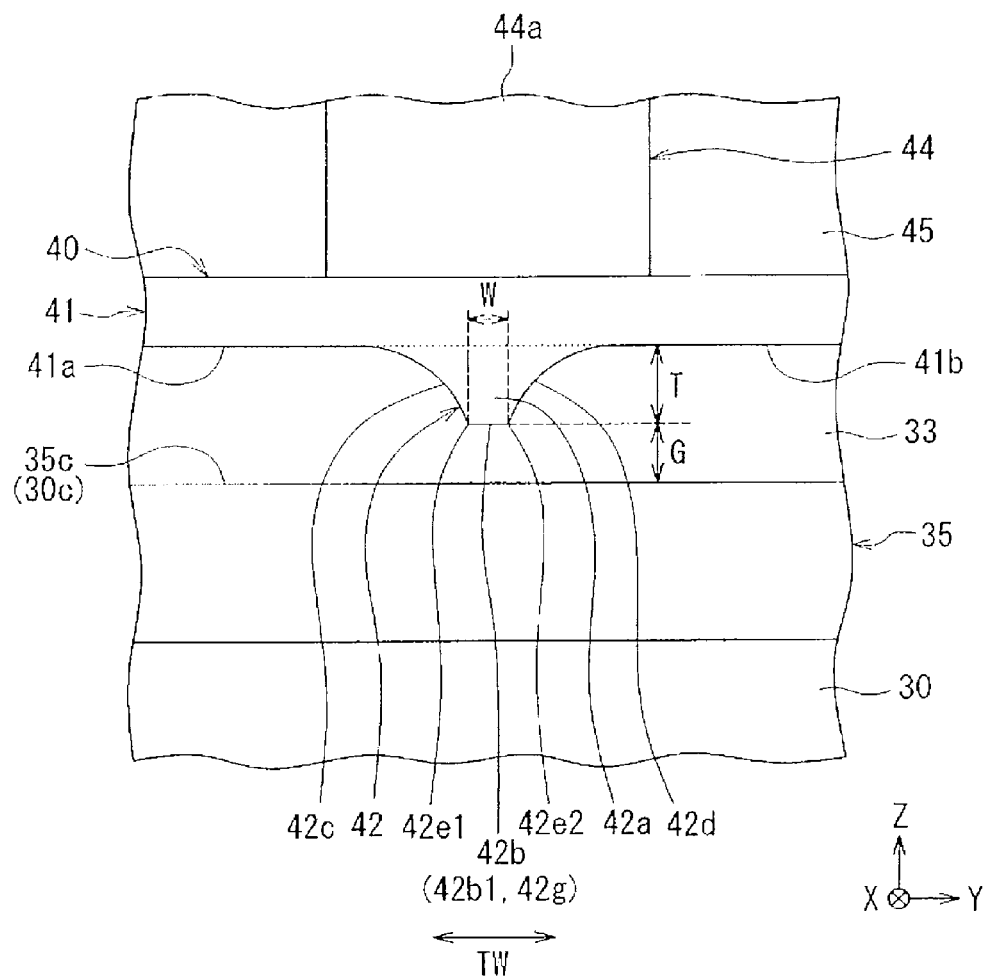
FIG. 1 is a front view showing the main part of a near-field light generator according to a first embodiment of the invention.
Figure 2:
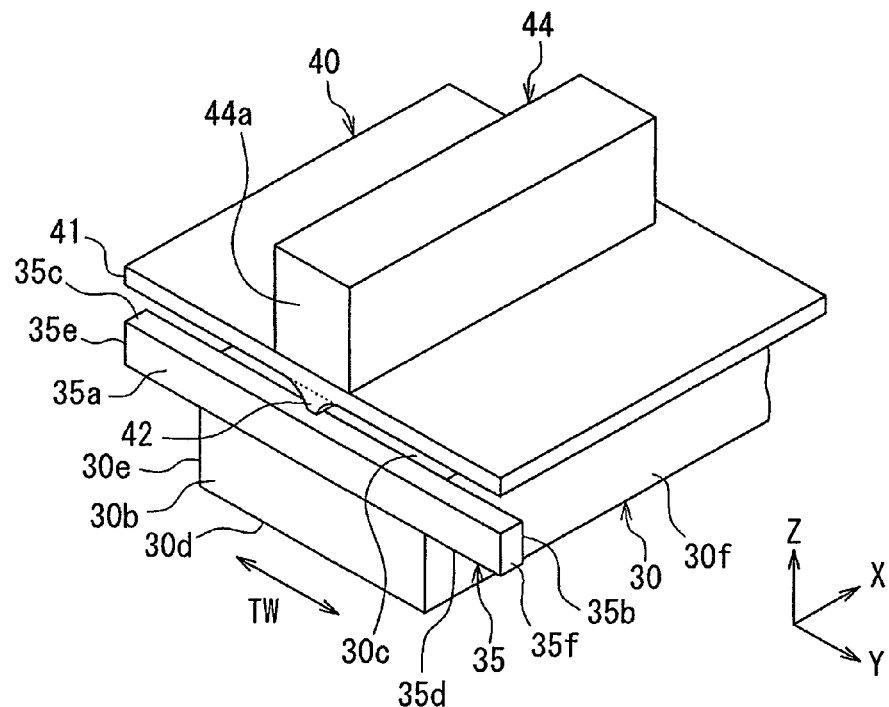
FIG. 2 is a perspective view showing the main part of a thermally-assisted magnetic recording head according to the first embodiment of the invention.
Figure 3:
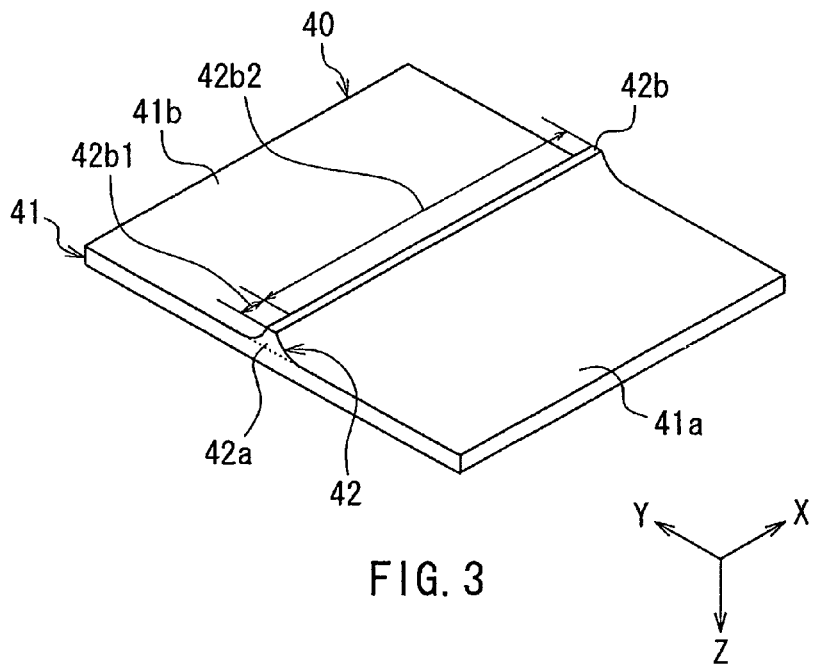
FIG. 3 is a perspective view showing a plasmon generator of the first embodiment of the invention.
Figure 5:
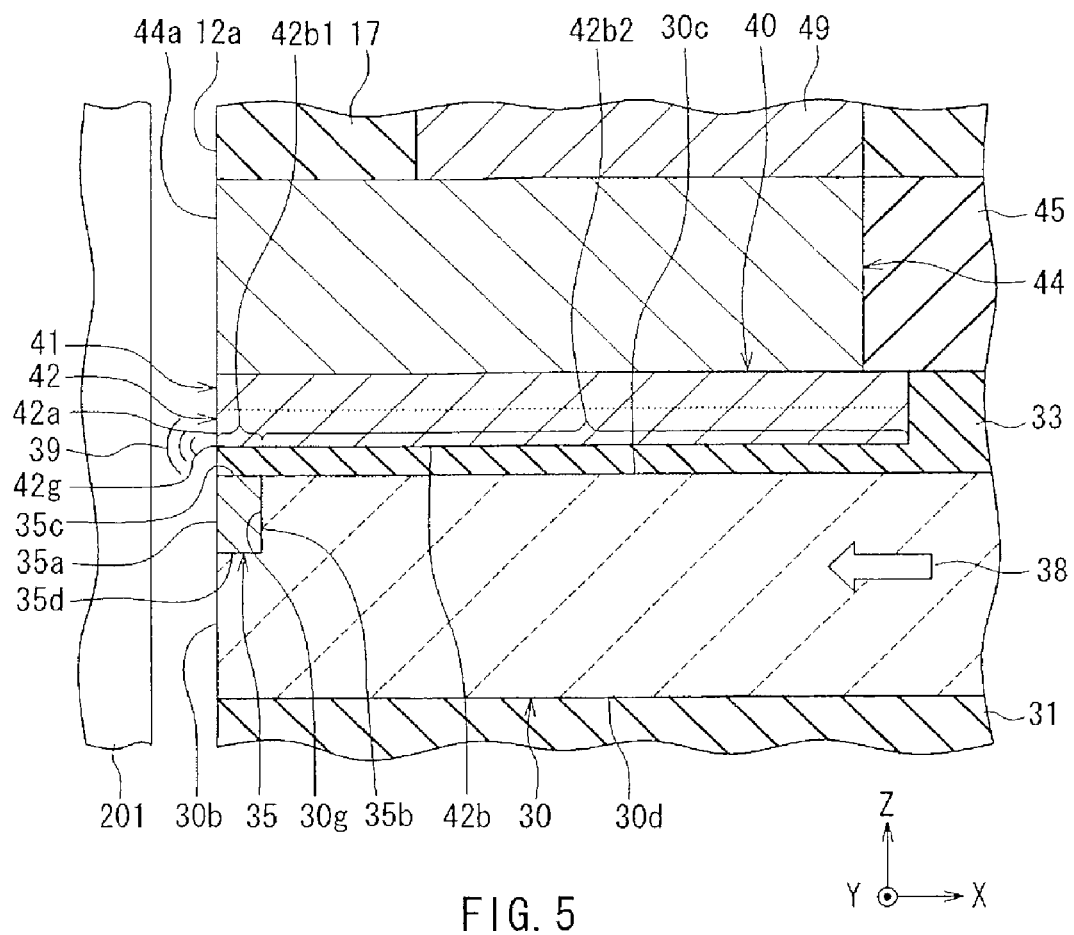
FIG. 5 is a cross-sectional view showing the main part of the thermally-assisted magnetic recording head according to the first embodiment of the invention.

Reference is now made to FIG. 1 to FIG. 5 to describe the shapes and the arrangement of the core 30, the metal layer 35, the plasmon generator 40, and the magnetic pole 44. FIG. 1 is a front view showing the main part of the near-field light generator. FIG. 2 is a perspective view showing the main part of the thermally-assisted magnetic recording head 1. FIG. 3 is a perspective view showing the plasmon generator 40. FIG. 3 shows the plasmon generator 40 of FIG. 2 in a reversed state. FIG. 4 is a front view showing the main part of the thermally-assisted magnetic recording head 1. FIG. 5 is a cross-sectional view showing the main part of the thermally-assisted magnetic recording head 1. Note that FIG. 1 and FIG. 4 show part of the medium facing surface 12a. FIG. 5 shows a cross section perpendicular to the element-forming surface 11c and the medium facing surface 12a.

The core 30 has, in addition to the incidence end 30a shown in FIG. 9, a front end face 30b located closer to the medium facing surface 12a, an evanescent light generating surface 30c or a top surface, a bottom surface 30d, and two side surfaces 30e and 30f. FIGS. 1, 2, 4 and 5 show an example where the front end face 30b is located in the medium facing surface 12a; however, the front end face 30b may be located away from the medium facing surface 12a. The evanescent light generating surface 30c generates evanescent light based on the light propagating through the core 30. The evanescent light generating surface 30c is perpendicular to the Z direction. The core 30 and the metal layer 35 are located on the same side relative to the plasmon generator 40 in a first direction (the Z direction) perpendicular to the evanescent light generating surface 30c. In the present embodiment, in particular, the core 30 and the metal layer 35 are located backward along the Z direction (located on the leading end side) relative to the plasmon generator 40. A portion of the cladding layer 33 is interposed between the plasmon generator 40 and each of the core 30 and the metal layer 35.

As shown in FIG. 2, the metal layer 35 is in the shape of a rectangular solid that is elongated in the Y direction. The metal layer 35 has: a front end face 35a located in the medium facing surface 12a; a rear end face 35b opposite to the front end face 35a; a top end face 35c; a bottom end face 35d opposite to the top end face 35c; and side end faces 35e and 35f that are located at opposite ends in the Y direction.

As shown in FIG. 5, the core 30 has a cut-out 30g in the vicinity of the front end face 30b and the evanescent light generating surface 30c. The metal layer 35 is disposed such that a portion thereof is accommodated in the cut-out 30g. The top end face 35c of the metal layer 35 and the evanescent light generating surface 30c may be flush with each other or may have a difference in level therebetween.

The plasmon generator 40 includes a base part 41, and a protruding part 42 that protrudes from the base part 41 toward the evanescent light generating surface 30c. The base part 41 is shaped like a flat pate, for example. In FIG. 1 to FIG. 5, the boundary between the base part 41 and the protruding part 42 is shown by a dotted line.

The base part 41 has a first base surface 41a and a second base surface 41b that face toward the evanescent light generating surface 30c and are located on opposite sides of the protruding part 42 in a second direction (the Y direction) parallel to the evanescent light generating surface 30c. The first and second base surfaces 41a and 41b are parallel to the evanescent light generating surface 30c.

The protruding part 42 has: a front end face 42a located at an end in a third direction (the X direction) orthogonal to the first and second directions; a flat surface 42b that is shaped like a band and elongated in the third direction (the X direction), the flat surface 42b facing toward the evanescent light generating surface 30c and being parallel to the evanescent light generating surface 30c; and a first side surface 42c and a second side surface 42d that are at a distance from each other. The flat surface 42b is located closer to the evanescent light generating surface 30c than are the first and second base surfaces 41a and 41b. The first side surface 42c connects the flat surface 42b to the first base surface 41a. The second side surface 42d connects the flat surface 42b to the second base surface 41b.

At least a portion of the protruding part 42 is configured so that the distance between the first and second side surfaces 42c and 42d in the second direction (the Y direction) increases with increasing distance from the evanescent light generating surface 30c. In the present embodiment, in particular, the entire protruding part 41a is configured so that the distance between the first and second side surfaces 42c and 42d in the second direction (the Y direction) increases with increasing distance from the evanescent light generating surface 30c. As shown in FIG. 1, an edge 42e1 is formed at the boundary between the flat surface 42b and the side surface 42c, and an edge 42e2 is formed at the boundary between the flat surface 42b and the side surface 42d.

In the present embodiment, the angle formed by each of the first and second side surfaces 42c and 42d of the protruding part 42 with respect to the first direction (the Z direction) increases with increasing distance from the evanescent light generating surface 30c. For example, each of the side surfaces 42c and 42d may be shaped like a part of an inner circumferential surface of a cylinder. At the position of the boundary between the flat surface 42b and the side surface 42c and the position of the boundary between the flat surface 42b and the side surface 42d, the side surfaces 42c and 42d may form an angle of 0° with respect to the first direction (the Z direction). At the position of the boundary between the side surface 42c and the base surface 41a and the position of the boundary between the side surface 42d and the base surface 41b, the side surfaces 42c and 42d may form an angle of 90° with respect to the first direction (the Z direction).

Note that the side surfaces 42c and 42d may have a shape other than the shape described above. For example, each of the side surfaces 42c and 42d may be a plane inclined with respect to the first direction (the Z direction). The protruding part 42 may have a portion in which the distance between the side surfaces 42c and 42d in the second direction (the Y direction) is constant regardless of the distance from the evanescent light generating surface 30c, and such a portion may be located in the vicinity of the flat surface 42b.

The front end face 42a of the protruding part 42 includes a near-field light generating part 42g that generates near-field light. More specifically, the near-field light generating part 42g is an end of the front end face 42a intersecting the flat surface 42b, or refers to this end and a part therearound.

As shown in FIG. 3 and FIG. 5, the flat surface 42b includes a first portion 42b1 contiguous with the front end face 42a, and a second portion 42b2 that is located farther from the front end face 42a than is the first portion 42b1. The top end face 35c of the metal layer 35 faces the first portion 42b1 of the flat surface 42b. The top end face 35c therefore corresponds to the "end face that faces the first portion of the flat surface" according to the invention. The first portion 42b1 is a portion of the flat surface 42b opposed to the top end face 35c of the metal layer 35. The evanescent light generating surface 30c faces the second portion 42b2 of the flat surface 42b. The second portion 42b2 is a portion of the flat surface 42b opposed to the evanescent light generating surface 30c. A portion of the cladding layer 33 is interposed between the flat surface 42b and each of the top end face 35c and the evanescent light generating surface 30c. Consequently, the first portion 42b1 and the second portion 42b2 of the flat surface 42b are at a predetermined distance from the top end face 35c and the evanescent light generating surface 30c, respectively.

Here, as shown in FIG. 1, the difference in level between the flat surface 42b and each of the first and second base surfaces 41a and 41b in the first direction (the Z direction) will be represented by the symbol T. The difference in level T falls within the range of 20 to 50 nm. The width of the flat surface 42b in the second direction (the Y direction) will be represented by the symbol W. The width W falls within the range of 5 to 35 nm. The distance between the first portion 42b1 of the flat surface 42b and the top end face 35c of the metal layer 35 will be represented by the symbol G. The distance G falls within the range of 10 to 40 nm. The distance between the second portion 42b2 of the flat surface 42b and the evanescent light generating surface 30c falls within the range of 10 to 80 nm, for example.

The length of the first portion 42b1 of the flat surface 42b in the third direction (the X direction), that is, the dimension of the top end face 35c of the metal layer 35 in the third direction (the X direction), preferably falls within the range of 40 to 80 nm, and more preferably within the range of 50 to 60 nm. The length of the second portion 42b2 of the flat surface 42b in the third direction (the X direction) falls within the range of 0.8 to 1.6 µm, for example.

The base part 41 has a dimension in the X direction (length) of, for example, 0.8 to 1.6 µm. In the present embodiment, the protruding part 42 has a dimension in the X direction (length)

equal to that of the base part 41. The base part 41 has a dimension in the Y direction (width) of, for example, 0.3 to 30 μm. The base part 41 has a dimension in the Z direction (thickness) of, for example, 30 to 300 nm.

A portion of the core 30 in the vicinity of the plasmon generator 40 has a dimension in the Y direction (width) of, for example, 0.3 to 1 μm. The remaining portion of the core 30 may have a width greater than that of the portion of the core 30 in the vicinity of the plasmon generator 40. The portion of the core 30 in the vicinity of the plasmon generator 40 has a dimension in the Z direction (thickness) of, for example, 0.3 to 0.6 μm.

The metal layer 35 preferably has a dimension in the X direction within the range of 40 to 80 nm, and more preferably within the range of 50 to 60 nm, as does the top end face 35c. The metal layer 35 has a dimension in the Y direction of, for example, 0.05 to 50 μm. The metal layer 35 has a dimension in the Z direction of, for example, 30 to 3000 nm.

The magnetic pole 44 is disposed on the top surface of the base part 41 of the plasmon generator 40. The magnetic pole 44 has an end face 44a located in the medium facing surface 12a. The end face 44a is located forward along the Z direction, i.e., located on the trailing end side, relative to the front end face 42a of the protruding part 42 of the plasmon generator 40.

Reference is now made to FIG. 5 to describe the principle of generation of near-field light in the present embodiment and the principle of thermally-assisted magnetic recording using the near-field light. Laser light 38 emitted from the laser diode 60 propagates through the core 30 of the waveguide to reach the vicinity of the plasmon generator 40. Here, the laser light 38 is totally reflected at the evanescent light generating surface 30c. This causes evanescent light to occur from the evanescent light generating surface 30c to permeate into the cladding layer 33. Then, surface plasmons are excited on at least the second portion 42b2 of the flat surface 42b of the plasmon generator 40 through coupling with the evanescent light. The surface plasmons propagate along the flat surface 42b to the near-field light generating part 42g. Consequently, the surface plasmons concentrate at the near-field light generating part 42g, and near-field light 39 is generated from the near-field light generating part 42g based on the surface plasmons.

The near-field light 39 is projected toward the magnetic disk 201, reaches the surface of the magnetic disk 201 and heats a part of the magnetic recording layer of the magnetic disk 201. This lowers the coercivity of the part of the magnetic recording layer. In thermally-assisted magnetic recording, the part of the magnetic recording layer with the lowered coercivity is subjected to a write magnetic field produced by the magnetic pole 44 for data writing.

Figure 10:
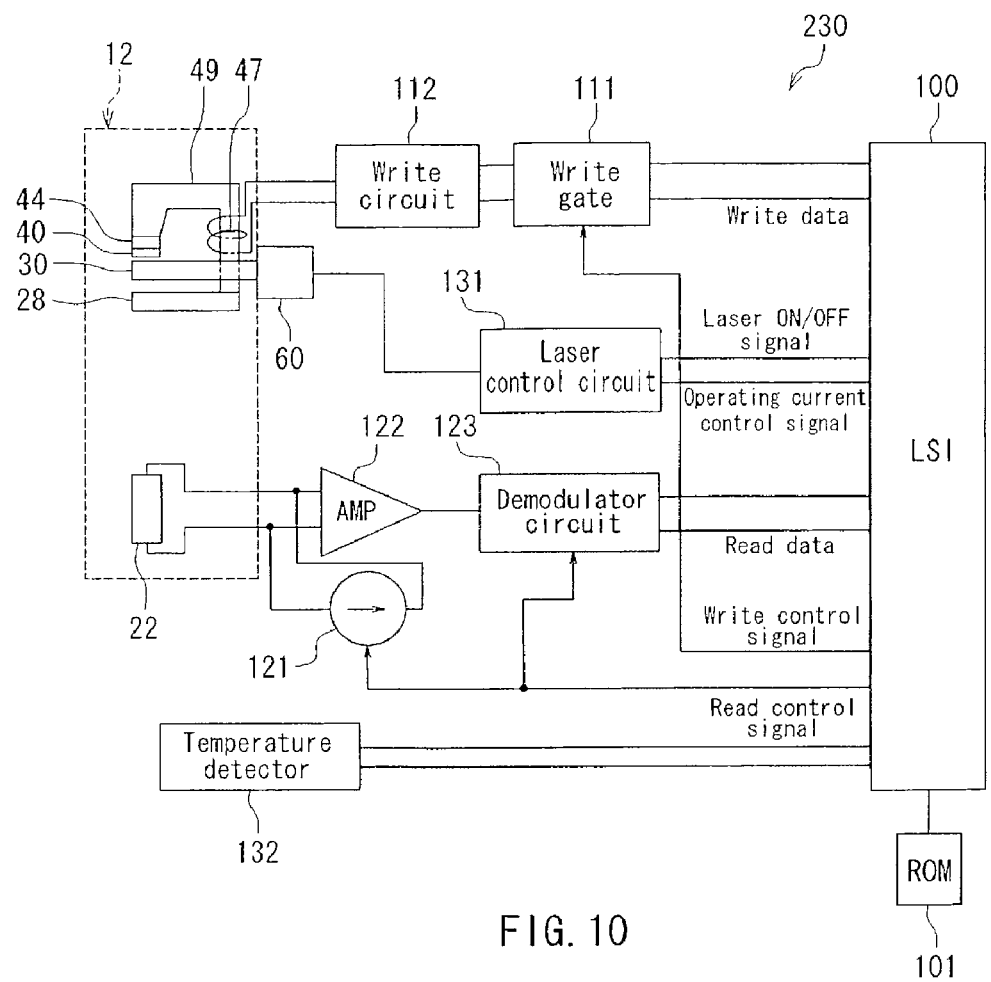
FIG. 10 is a block diagram showing the circuit configuration of the magnetic recording device according to the first embodiment of the invention.

Reference is now made to FIG. 10 to describe the circuit configuration of the control circuit 230 shown in FIG. 6 and the operation of the thermally-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coil 47.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 60 and the control LSI 100, and a temperature detector 132 connected to the control LSI 100.

The control LSI 100 supplies write data and a write control signal to the write gate 111. The control LSI 100 supplies a read control signal to the constant current circuit 121 and the demodulator circuit 123, and receives read data output from the demodulator circuit 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 60.

In a write operation, the control LSI 100 supplies write data to the write gate 111. The write gate 111 supplies the write data to the write circuit 112 only when the write control signal indicates a write operation. According to the write data, the write circuit 112 passes a write current through the coil 47. Consequently, the magnetic pole 44 produces a write magnetic field and data is written on the magnetic recording layer of the magnetic disk 201 through the use of the write magnetic field.

In a read operation, the constant current circuit 121 supplies a certain sense current to the MR element 22 only when the read control signal indicates a read operation. The output voltage of the MR element 22 is amplified by the amplifier 122 and input to the demodulator circuit 123. When the read control signal indicates a read operation, the demodulator circuit 123 demodulates the output of the amplifier 122 to generate read data, and supplies the read data to the control LSI 100.

The laser control circuit 131 controls the supply of the operating current to the laser diode 60 on the basis of the laser ON/OFF signal, and also controls the value of the operating current to be supplied to the laser diode 60 on the basis of operating current control signal. When the laser ON/OFF signal indicates an ON operation, the laser control circuit 131 exercises control so that an operating current at or above an oscillation threshold is supplied to the laser diode 60. Consequently, the laser diode 60 emits laser light, and the laser light propagates through the core 30. Then, according to the principle of generation of near-field light described previously, the near-field light 39 is generated from the near-field light generating part 42g of the plasmon generator 40. The near-field light 39 heats a part of the magnetic recording layer of the magnetic disk 201, thereby lowering the coercivity of that part. When writing, the part of the magnetic recording layer with the lowered coercivity is subjected to the write magnetic field produced by the magnetic pole 44 for data writing.

On the basis of such factors as the temperature of the magnetic recording layer of the magnetic disk 201 measured by the temperature detector 132, the control LSI 100 consults the control table stored in the ROM 101 to determine the value of the operating current of the laser diode 60. Using the operating current control signal, the control LSI 100 controls the laser control circuit 131 so that the operating current of that value is supplied to the laser diode 60. The control table contains, for example, data that indicates the oscillation threshold and the temperature dependence of the light output versus operating current characteristic of the laser diode 60. The control table may further contain data that indicates the relationship between the operating current value and a temperature increase of the magnetic recording layer heated by the near-field light 39, and data that indicates the temperature dependence of the coercivity of the magnetic recording layer.

As shown in FIG. 10, the control circuit 230 has the signal system for controlling the laser diode 60, i.e., the signal system consisting of the laser ON/OFF signal and the operating current control signal, independent of the control signal system intended for read/write operations. This configuration makes it possible to implement various modes of energization of the laser diode 60, not only to energize the laser diode 60 simply in association with a write operation. It should be noted that the control circuit 230 may have any other configuration than the configuration shown in FIG. 10.

An example of the method of forming the plasmon generator 40 will now be described. In the method, the core 30, the metal layer 35 and the cladding layer 32 are formed first, and then a first dielectric layer is formed thereon. The first dielectric layer is made of the material selected for the cladding layer 33. Next, an etching mask is formed on the first dielectric layer. The etching mask has an opening whose shape corresponds to the planar shape (the shape viewed from above) of the protruding part 42 of the plasmon generator 40 to be formed later. Using this etching mask, the first dielectric layer is then etched by, for example, reactive ion etching or ion milling to form therein a groove having a shape corresponding to the protruding part 42. The etching mask is then removed.

Next, a metal film that is to later become the plasmon generator 40 is formed by, for example, sputtering, to cover the entire top surface of the first dielectric layer. The metal film is then partially etched by, for example, ion milling, and thereby patterned. The metal film thus patterned has the same planar shape as that of the base part 41 of the plasmon generator 40. Next, a second dielectric layer is formed to cover the metal film. The second dielectric layer is made of the material selected for the cladding layer 33. Next, the second dielectric layer is polished by, for example, chemical mechanical polishing until the metal film is exposed. This makes the metal film into the plasmon generator 40, and the first and second dielectric layers into the cladding layer 33.

The effects of the near-field light generator and the thermally-assisted magnetic recording head 1 according to the present embodiment will now be described. The plasmon generator 40 of the present embodiment includes the base part 41 and the protruding part 42. Of these parts, it is the protruding part 42 that mainly contributes to the excitation of surface plasmons. Heat is therefore generated at the protruding part 42. More specifically, a greater amount of heat is generated in an area of the protruding part 42 near the flat surface 42b. The base part 41 is contiguous with the protruding part 42 and extends in the Y direction more than the protruding part 42 does. Accordingly, the base part 41 functions as a heat sink for dissipating the heat generated at the protruding part 42 outward from the plasmon generator 40. In the present embodiment, in particular, the difference in level T between the flat surface 42b and each of the base surfaces 41a and 41b falls within the range of 20 to 50 nm. This means that the base part 41 serving as a heat sink is located near the source of heat generation (the area near the flat surface 42b). Accordingly, the present embodiment allows the heat generated at the protruding part 42 (particularly in the area near the flat surface 42b) to be effectively transferred to the base part 41 and then dissipated from the base part 41 to the outside of the plasmon generator 40. Note that this effect is degraded when the aforementioned difference in level T is above 50 nm. According to the present embodiment, since the base part 41 functions as a heat sink as described above, it is possible to prevent an increase in temperature of the plasmon generator 40.

Furthermore, in the present embodiment, the metal layer 35 is disposed near the first portion 42b1 of the flat surface 42b. The metal layer 35 also functions as a heat sink for dissipating heat outward from the plasmon generator 40. This allows the plasmon generator 40 to be prevented from increasing in temperature with higher reliability. To make prominent the operation of the metal layer 35 as a heat sink, the metal layer 35 preferably has a greater dimension in the Y direction (width) than that of the portion of the core 30 in the vicinity of the plasmon generator 40.

According to the present embodiment, the shape of the plasmon generator 40 and the positional relationship between the core 30, the plasmon generator 40 and the metal layer 35 can permit the enhancement of the intensity of the near-field light generated from the near-field light generating part 42g of the plasmon generator 40. This effect results from first and second operations described below.

The first operation will be described first. In the present embodiment, surface plasmons are excited on at least the second portion 42b2 of the flat surface 42b of the plasmon generator 40 through coupling with the evanescent light generated from the evanescent light generating surface 30c of the core 30. The surface plasmons propagate along the flat surface 42b to the near-field light generating part 42g, and the near-field light 39 is generated from the near-field light generating part 42g based on the surface plasmons. The surface plasmons include multiple electric dipoles induced by the evanescent light. At the near-field light generating part 42g, the near-field light is generated by the electric lines of force of the electric dipoles. In the present embodiment, the difference in level T between the flat surface 42b and each of the base surfaces 41a and 41b falls within the range of 20 to 50 nm. This means that portions of the base surfaces 41a and 41b in the vicinity of the protruding part 42, which will hereinafter be referred to as the protrusion neighboring portions, are near the flat surface 42b. Accordingly, in the present embodiment, electric dipoles (surface plasmons) are induced by the aforementioned evanescent light also in the protrusion neighboring portions of the base surfaces 41a and 41b. Then, the electric line of force produced by the electric dipoles in the protrusion neighboring portions of the base surfaces 41a and 41b and the electric line of force produced by the electric dipoles on the flat surface 42b and the vicinity thereof are coupled with each other via part of the cladding layer 33, a dielectric. This produces a high-density electric line of force in the vicinity of the flat surface 42b.

Now, the second operation will be described. In the present embodiment, the metal layer 35 having the top end face 35c that faces the first portion 42b1 of the flat surface 42b is provided in the vicinity of the medium facing surface 12a. The distance G between the first portion 42b1 of the flat surface 42b and the top end face 35c of the metal layer 35 falls within the range of 10 to 40 nm. Since the top end face 35c of the metal layer 35 is thus in such a proximity to the first portion 42b1 of the flat surface 42b, electric dipoles (surface plasmons) are induced also on the top end face 35c. Then, the electric line of force produced by the electric dipoles on the top end face 35c and the electric line of force produced by the electric dipoles on the flat surface 42b and the vicinity thereof are coupled with each other via part of the cladding layer 33, a dielectric. This produces a high-density electric line of force in the vicinity of the first portion 42b1 of the flat surface 42b.

In the present embodiment, the above-described first and second operations cause a high-density electric line of force, or in other words, an electric field of high intensity, to be produced in the vicinity of the first portion 42b1 of the flat surface 42b. This makes it possible to increase the intensity of the near-field light generated from the near-field light generating part 42g.

In at least a portion of the protruding part 42, the distance between the side surfaces 42c and 42d in the second direction (the Y direction) increases with increasing distance from the evanescent light generating surface 30c. The effect provided by this configuration will now be described. When the protruding part 42 has such a configuration, at least part of each of the side surfaces 42c and 42d is not perpendicular to the evanescent light generating surface 30c but inclined with respect to the Z direction so as to be oriented toward the evanescent light generating surface 30c. This causes electric dipoles (surface plasmons) to be induced by the evanescent light also on at least part of each of the side surfaces 42c and 42d. This increases the intensity of the electric field in the vicinity of the first portion 42b1 of the flat surface 42b, and as a result, the intensity of the near-field light generated from the near-field light generating part 42g is increased.

Now, a protruding part of a comparative example will be contemplated for the purpose of comparison with the protruding part 42 of the present embodiment. The protruding part of the comparative example has such a configuration that the two side surfaces of the protruding part are perpendicular to the evanescent light generating surface 30c, and the distance between the two side surfaces in the second direction (the Y direction) is constant in the entire protruding part regardless of the distance from the evanescent light generating surface 30c. In the protruding part of the comparative example, almost no electric dipoles (surface plasmons) are induced on the two side surfaces by the evanescent light. The protruding part of the comparative example thus causes the near-field light generated from the near-field light generating part 42g to be low in intensity. This can be seen from the results of a simulation, which will be shown later.

Next, a description will be made as to the effect achieved by the protruding part 42 having the flat surface 42b. To make a comparison with the protruding part 42 of the present embodiment, a protruding part of a comparative example will be contemplated which does not have the flat surface 42b, with the side surfaces 42c and 42d intersecting with each other to form an edge. In this protruding part of the comparative example, electric dipoles (surface plasmons) are induced mainly on the aforementioned edge. However, since the area where the electric dipoles are induced is extremely narrow, the electric field is low in intensity in the vicinity of the edge. As a result, the near-field light is also low in intensity. In contrast to this, according to the present embodiment, electric dipoles (surface plasmons) are induced on the flat surface 42b which is broader than the aforementioned edge. This increases the intensity of the electric field in the vicinity of the first portion 42b1 of the flat surface 42b, and consequently increases the intensity of the near-field light generated from the near-field light generating part 42g.

Now, the ranges of the difference in level T between the flat surface 42b and the base surfaces 41a and 41b, the width W of the flat surface 42b, and the distance G between the first portion 42b1 of the flat surface 42b and the top end face 35c of the metal layer 35 will be described.

The range of the difference in level T will be described first. The intensity and the spot diameter of the near-field light depend on the intensity distribution of the near-field light in the vicinity of the near-field light generating part 42g. Simulations were performed with various differences in level T to study variations in the intensity distribution of the near-field light in the vicinity of the near-field light generating part 42g. The results showed that to enhance the intensity of the near-field light and reduce the spot diameter of the near-field light, the difference in level T should preferably fall within the range of 20 to 50 nm. If the difference in level T is smaller than 20 nm, the intensity distribution of the near-field light spreads in the Y direction. This increases the spot diameter in the Y direction and reduces the intensity of the near-field light. On the other hand, if the difference in level T is greater than 50 nm, the intensity distribution of the near-field light spreads in the Z direction and the spot diameter in the Z direction thus increases. In both cases where the spot diameter increases in the Y direction and the spot diameter increases in the Z direction, it is difficult to achieve higher recording densities. The present embodiment therefore specifies that the difference in level T falls within the range of 20 to 50 nm.

The width W will now be described. The spot shape of the near-field light depends on the width W. If the width W exceeds 35 nm, the spot diameter in the Y direction increases and therefore it becomes difficult achieve higher recording densities. On the other hand, if the width W is smaller than 5 nm, it becomes difficult to form constantly the plasmon generator 40 having the flat surface 42b of such a width W. When the width W varies in the process of forming the plasmon generator 40, the difference in level T and the distance G also tend to vary at the same time. From these facts, it can be said that if the width W is smaller than 5 nm, the properties of the plasmon generator 40 tend to be varied. In view of the foregoing, the present embodiment specifies that the width W falls within the range of 5 to 35 nm.

The distance G will now be described. If the distance G is excessively great, the second operation described previously becomes unable to sufficiently work, and as a result, the intensity of the near-field light is reduced. On the other hand, simulations showed that too small a distance G also reduced the intensity of the near-field light. This is presumably because the charges on the top end face 35c and those on the first portion 42b1 of the flat surface 42b do not vibrate synchronously. The simulations showed that so long as the distance G was within the range of 10 to 40 nm, the foregoing second operation worked to increase the intensity of the near-field light. The present embodiment therefore specifies that the distance G falls within the range of 10 to 40 nm.

As has been described, the present embodiment allows the near-field light generated from the plasmon generator 40 to be increased in intensity, allows the spot diameter of the near-field light to be reduced, and allows the plasmon generator 40 to be prevented from being increased in temperature.

Figure 11:
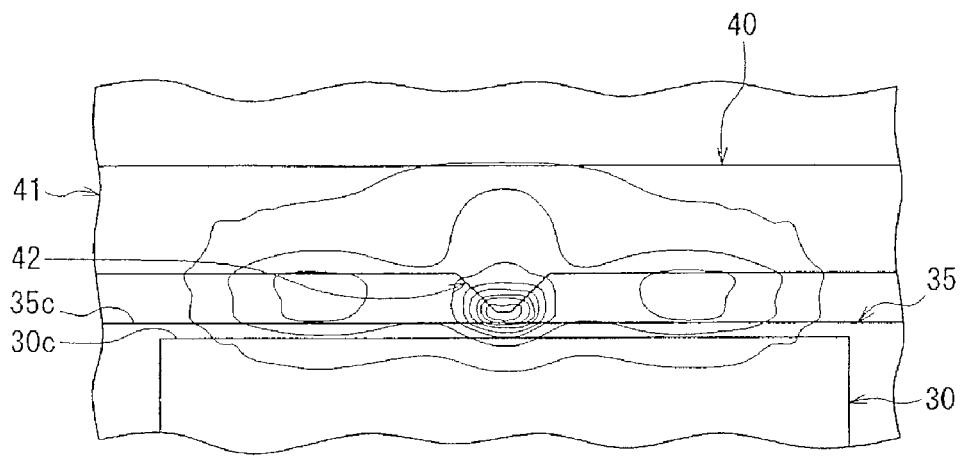
FIG. 11 is an explanatory diagram showing a model of a near-field light generator of a practical example and the intensity distribution of near-field light.
Figure 12:
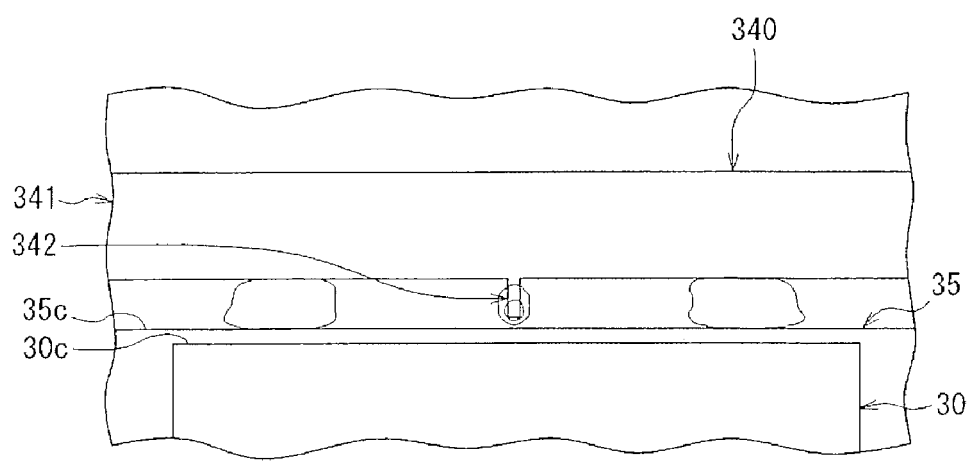
FIG. 12 is an explanatory diagram showing a model of a near-field light generator of a first comparative example and the intensity distribution of near-field light.
Figure 13:
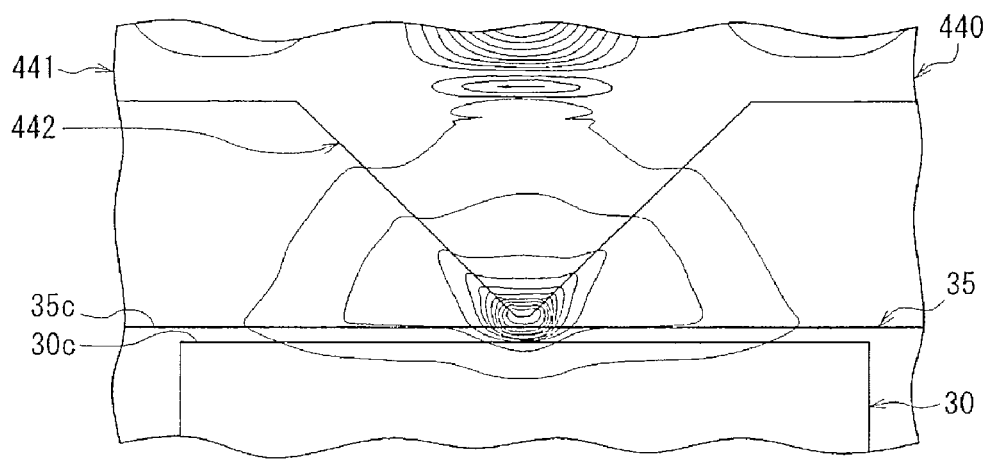
FIG. 13 is an explanatory diagram showing a model of a near-field light generator of a second comparative example and the intensity distribution of near-field light.

Now, a description will be given of the results of simulations that were performed to investigate the intensity distributions of the near-field light generated by near-field light generators of a practical example and first and second comparative examples. The simulations were performed by the three-dimensional finite-difference time-domain method (the FDTD method). FIG. 11 shows a model of the near-field light generator of the practical example. FIG. 12 shows a model of the near-field light generator of the first comparative example. FIG. 13 shows a model of the near-field light generator of the second comparative example. FIG. 11 to FIG. 13 also show, for the respective models, the intensity distributions of the near-field light on the surface of a magnetic recording medium which is located at a distance of 11 nm from the medium facing surface 12a. FIG. 11 to FIG. 13 each illustrate a plurality of curves or contour lines that indicate the intensity of the near-field light.

The model of the near-field light generator of the practical example shown in FIG. 11 satisfies the requirements for the near-field light generator according to the present embodiment. In the model of the practical example, the protruding part 42 of the plasmon generator 40 has the flat surface 42b and the first and second side surfaces 42c and 42d. Note that FIG. 11 shows no symbols 42b, 42c, and 42d to avoid obscuring the contour lines. In the model of the practical example, each of the side surfaces 42c and 42d is a plane inclined by 45° with respect to the first direction (the Z direction). The difference in level T is 35 nm, the width W is 10 nm, and the distance G is 15 nm. The base part 41 has a dimension in the X direction (length) of 1.2 μm, a dimension in the Y direction (width) of 2 μm, and a dimension in the Z direction (thickness) of 100 nm. The metal layer 35 has a dimension in the X direction (length) of 50 nm, a dimension in the Y direction (width) of 1.2 μm, and a dimension in the Z direction (thickness) of 400 nm.

The model of the near-field light generator of the first comparative example shown in FIG. 12 has a plasmon generator 340 instead of the plasmon generator 40. The plasmon generator 340 includes a base part 341, and a protruding part 342 that protrudes from the base part 341 toward the evanescent light generating surface 30c. The protruding part 342 has a flat surface of the same shape as the flat surface 42b of the model of the practical example, and two side surfaces replacing the side surfaces 42c and 42d. The two side surfaces are perpendicular to the evanescent light generating surface 30c. In the model of the first comparative example, the distance between the two side surfaces in the second direction (the Y direction) is constant in the entire protruding part 342 regardless of the distance from the evanescent light generating surface 30c. The difference in level T, the width W, the distance G, the shape of the base part, and the shape of the metal layer 35 of the model of the first comparative example are the same as those of the model of the practical example.

The model of the near-field light generator of the second comparative example shown in FIG. 13 has a plasmon generator 440 instead of the plasmon generator 40. The plasmon generator 440 includes a base part 441, and a protruding part 442 that protrudes from the base part 441 toward the evanescent light generating surface 30c. The protruding part 442 has a flat surface of the same shape as the flat surface 42b of the model of the practical example, and two side surfaces replacing the side surfaces 42c and 42d. Each of the two side surfaces is a plane inclined by 45° with respect to the first direction (the Z direction). The model of the second comparative example is configured so that the width W, the distance G, the shape of the base part, and the shape of the metal layer 35 are the same as those of the model of the practical example; however, unlike the model of the practical example, the difference in level T is 200 nm.

For all the models of the practical example and the first and second comparative examples, the material of the core 30 is tantalum oxide, the material of the plasmon generator 40 and the metal layer 35 is Au, and the material of the cladding is $SiO_2$. The portion of the core 30 in the vicinity of the plasmon generator has a dimension in the Y direction (width) of 600 nm and a dimension in the Z direction (thickness) of 400 nm. The laser light to propagate through the core 30 is polarized light of TM mode (the electric field of the laser light oscillates in a direction perpendicular to the evanescent light generating surface 30c), and has a wavelength of 800 nm.

Figure 14:
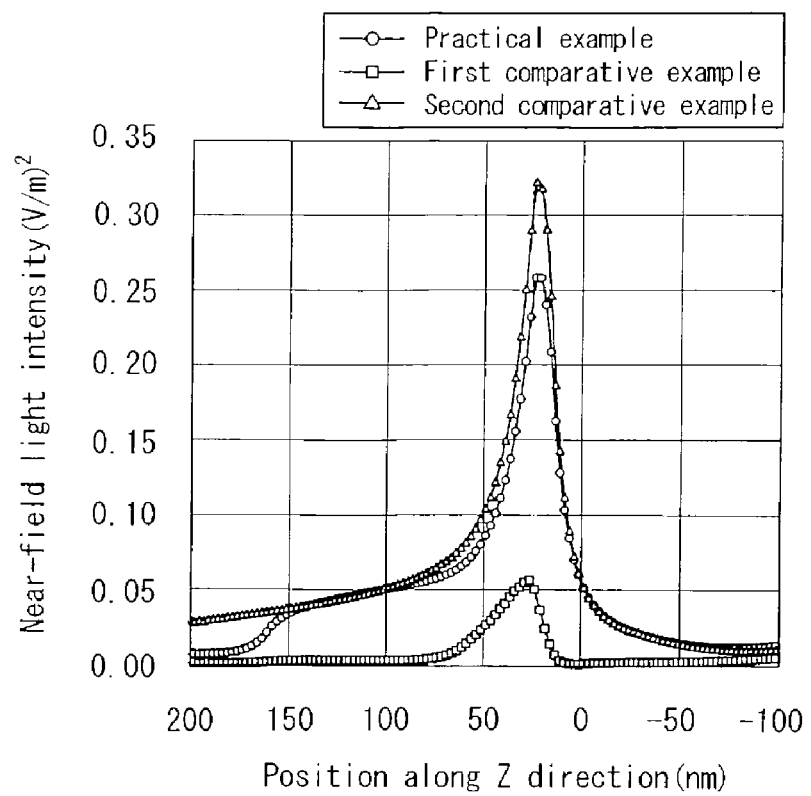
FIG. 14 is a characteristic chart showing the intensity distribution in the Z direction among the intensity distributions shown in FIG. 11 to FIG. 13.
Figure 15:
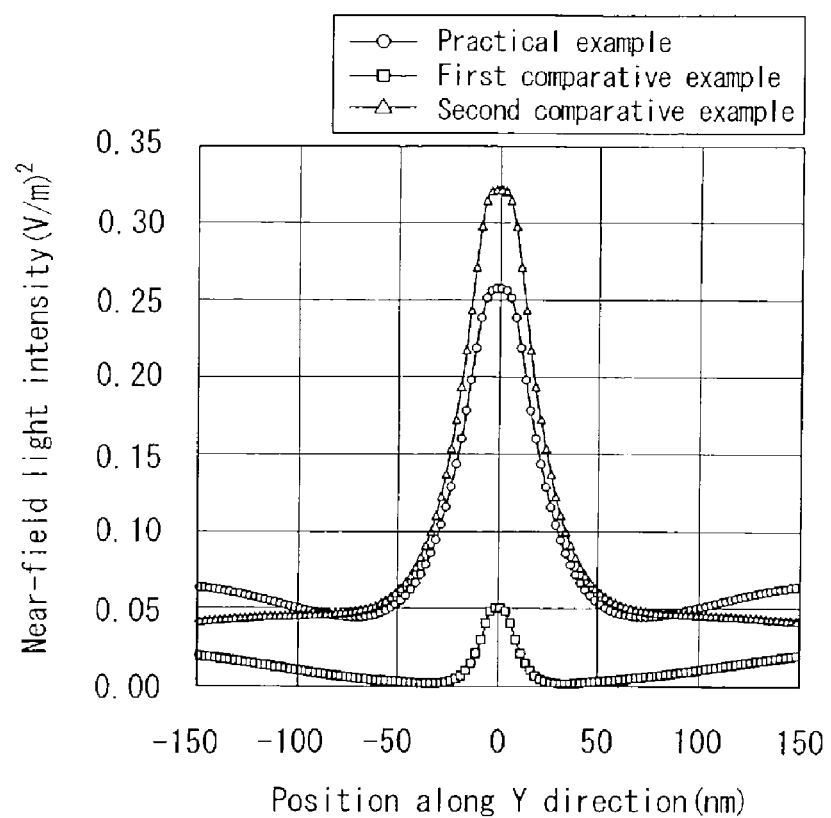
FIG. 15 is a characteristic chart showing the intensity distribution in the Y direction among the intensity distributions shown in FIG. 11 to FIG. 13.

FIG. 14 shows the intensity distribution in the Z direction among the intensity distributions shown in FIG. 11 to FIG. 13. In FIG. 14, the horizontal axis represents the position along the Z direction and the vertical axis represents the near-field light intensity. On the horizontal axis, with the position of the evanescent light generating surface 30c assumed as 0 nm, any position forward of the 0 nm position along the Z direction (any position on the trailing end side) is expressed in a positive value, whereas any position backward of the 0 nm position along the Z direction (any position on the leading end side) is expressed in a negative value. FIG. 15 shows the intensity distribution in the Y direction among the intensity distributions shown in FIG. 11 to FIG. 13. In FIG. 15, the horizontal axis represents the position along the Y direction and the vertical axis represents the near-field light intensity. On the horizontal axis, with the position of the center of the protruding part in the Y direction assumed as 0 nm, any position forward of the 0 nm position along the Y direction is expressed in a positive value, whereas any position backward of the 0 nm position along the Y direction is expressed in a negative value.

The model of the practical example shown in FIG. 11 exhibits a high intensity and a narrow intensity distribution of the near-field light. This is the effect provided by the first and second operations described previously. In contrast to this, the model of the first comparative example shown in FIG. 12 is considerably lower in near-field light intensity when compared with the model of the practical example. This is because, as described previously, almost no electric dipoles (surface plasmons) are induced by the evanescent light on the two side surfaces of the protruding part.

For the model of the second comparative example shown in FIG. 13, the intensity distribution of the near-field light is spread in the Z direction as compared with the intensity distribution provided by the model of the practical example. If a comparison is made as to the full width at half maximum of the near-field light intensity distribution in the Z direction shown in FIG. 14, the model of the practical example is smaller by 6% than the model of the second comparative example in the full width at half maximum. The full width at half maximum of the intensity distribution of near-field light corresponds to the spot diameter of near-field light. Accordingly, the results of the simulation show that the near-field light generator of the practical example is capable of providing near-field light of a smaller spot diameter in the Z direction when compared with the near-field light generator of the second comparative example.

Furthermore, although not illustrated, for a model obtained by excluding the metal layer 35 from the model of the practical example, the intensity distribution of the near-field light was found to be spread in the Z direction as compared with the intensity distribution provided by the model of the practical example. Compared with the model obtained by excluding the metal layer 35 from the model of the practical example, the model of the practical example was greater in the peak value of the near-field light intensity by about 24% and smaller in the full width at half maximum of the intensity distribution of the near-field light in the Z direction, i.e., the spot diameter of the near-field light in the Z direction, by about 18%. From these results, it can be seen that the metal layer 35 contributes to an increase in the intensity of the near-field light and a decrease in the spot diameter of the near-field light in the Z direction.

When compared with the near-field light generator of the second comparative example, the near-field light generator of the practical example can exhibit the effect of preventing an increase in temperature of the plasmon generator 40 more noticeably, because the base part 41 serving as a heat sink is located closer to the source of heat generation (the area near the flat surface 42b). Now, a description will be given of the results of an experiment that was carried out to confirm this effect. For the experiment, a thermally-assisted magnetic recording head of a practical example incorporating the near-field light generator of the practical example and a thermally-assisted magnetic recording head of a comparative example incorporating the near-field light generator of the second comparative example were actually fabricated to check variations in the characteristics of the thermally-assisted magnetic recording heads when used continuously for many hours.

The experiment was conducted using a spin stand and a measurement device connected thereto. The spin stand includes a device for rotating a magnetic disk and a device for positioning the head relative to the magnetic disk. In the experiment, each of the heads of the practical example and the comparative example was used to continually perform read and write operations for ten hours on an AC demagnetized magnetic disk having a magnetic recording layer of FePt, and variations in the level of the read output voltage were checked. As a result, the level of the read output voltage from the head of the comparative example was reduced by about 30% in ten hours, as compared with the level at the start of the experiment. This is thought to be because the characteristics of the head deteriorated due to an increase in temperature of the plasmon generator 40. In contrast to this, the level of the read output voltage from the head of the practical example did not drop significantly in ten hours as compared with the level at the start of the experiment. This is thought to be because the effect of preventing an increase in temperature of the plasmon generator 40 was exerted in the head of the practical example.

The results of the simulation and the experiment described above show that the present embodiment is capable of enhancing the intensity of the near-field light generated from the plasmon generator 40, making the spot diameter of the near-field light smaller, and preventing an increase in temperature of the plasmon generator 40.

Second Embodiment

A second embodiment of the invention will now be described with reference to FIG. 16 to FIG. 19. First, reference is made to FIG. 19 to describe the configuration of the thermally-assisted magnetic recording head 1 according to the present embodiment. FIG. 19 is a cross-sectional view showing the thermally-assisted magnetic recording head 1 according to the present embodiment. FIG. 19 shows a state where the slider 10 and the light source unit 50 are separated from each other.

In the thermally-assisted magnetic recording head 1 according to the present embodiment, the write head unit 16 has a different configuration from that in the first embodiment. The write head unit 16 of the present embodiment includes a return yoke layer 71 disposed on the insulating layer 27, and an insulating layer 81 disposed on the insulating layer 27 and surrounding the return yoke layer 71. The return yoke layer 71 is made of a soft magnetic material. The top surfaces of the return yoke layer 71 and the insulating layer 81 are even with each other.

The write head unit 16 further includes: a coupling layer 72 disposed away from the medium facing surface 12a and lying on a portion of the return yoke layer 71; an insulating layer 82 disposed over another portion of the return yoke layer 71 and the insulating layer 81; and a coil 90 disposed on the insulating layer 82. The coupling layer 72 is made of a soft magnetic material. The coil 90 is planar spiral-shaped and wound around the coupling layer 72.

The write head unit 16 further includes: an insulating layer 83 disposed around the coil 90 and the coupling layer 72 and in the space between every adjacent turns of the coil 90; an insulating layer 84 disposed on the insulating layer 82 and surrounding the insulating layer 83; and an insulating layer 85 disposed over the coil 90 and the insulating layers 83 and 84.

The top surfaces of the coupling layer 72, the coil 90 and the insulating layers 83 and 84 are even with each other.

The write head unit 16 further includes: a yoke layer 73 disposed over the coupling layer 72 and the insulating layer 85; and an insulating layer 86 disposed on the insulating layer 85 and surrounding the yoke layer 73. The yoke layer 73 is made of a soft magnetic material. The yoke layer 73 has an end face located in the medium facing surface 12a. The top surfaces of the yoke layer 73 and the insulating layer 86 are even with each other.

The write head unit 16 further includes: a coupling layer 74 disposed on the yoke layer 73; and a cladding layer 87 disposed over the yoke layer 73 and the insulating layer 86 and surrounding the coupling layer 74. The coupling layer 74 is made of a soft magnetic material. The coupling layer 74 has an end face located in the medium facing surface 12a. The top surfaces of the coupling layer 74 and the cladding layer 87 are even with each other.

The write head unit 16 further includes: a magnetic pole 75 disposed on a portion of the coupling layer 74; and a core 30 disposed over another portion of the coupling layer 74 and the cladding layer 87. The magnetic pole 75 is made of a soft magnetic material, or a magnetic metal material in particular.

In the write head unit 16, a magnetic path for passing a magnetic flux corresponding to the magnetic field produced by the coil 90 is formed by the return yoke layer 71, the coupling layer 72, the yoke layer 73, the coupling layer 74, and the magnetic pole 75. The magnetic pole 75 allows the magnetic flux corresponding to the magnetic field produced by the coil 90 to pass, and produces a write magnetic field.

The write head unit 16 further includes: a metal layer 35 provided in the vicinity of the medium facing surface 12a such that a portion of the metal layer 35 is embedded in the magnetic pole 75; and a cladding layer 88 disposed on the cladding layer 87 and surrounding the core 30, the magnetic pole 75 and the metal layer 35. The cladding layer 88 is not shown in FIG. 19 but is shown in FIG. 17, which will be described later.

The write head unit 16 further includes: a cladding layer 89 disposed over the core 30, the metal layer 35 and the cladding layer 88; and a plasmon generator 40 disposed above the core 30 and the metal layer 35 in the vicinity of the medium facing surface 12a. The plasmon generator 40 is embedded in the cladding layer 88. The protection layer 17 is disposed to cover the plasmon generator 40 and the cladding layer 89.

The near-field light generator according to the present embodiment includes a waveguide, the metal layer 35, and the plasmon generator 40. The waveguide includes the core 30 and a cladding. The cladding includes the cladding layers 87, 88, and 89.

Figure 16:
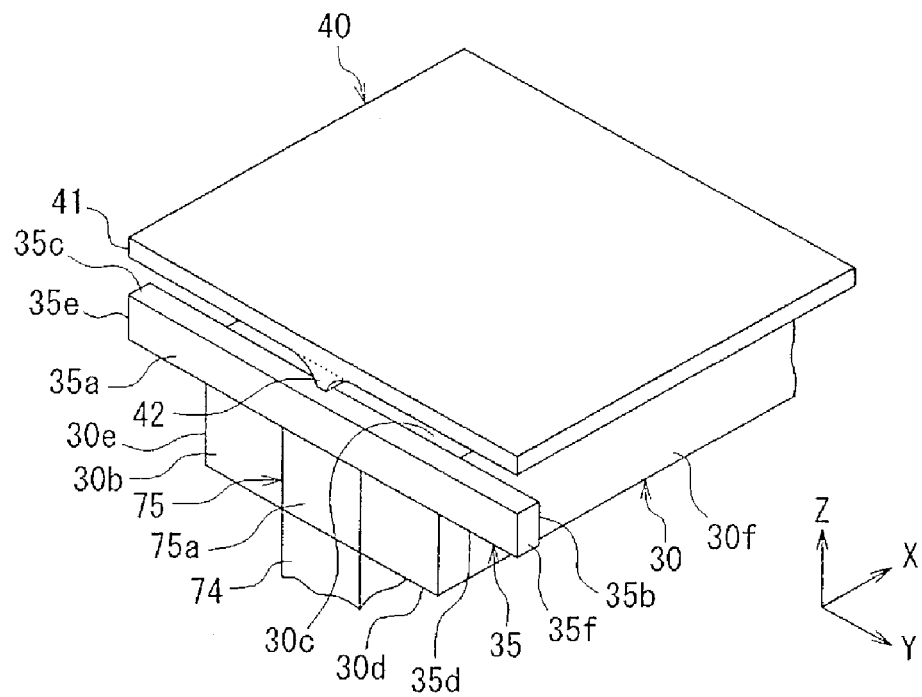
FIG. 16 is a perspective view showing the main part of a thermally-assisted magnetic recording head according to a second embodiment of the invention.
Figure 17:
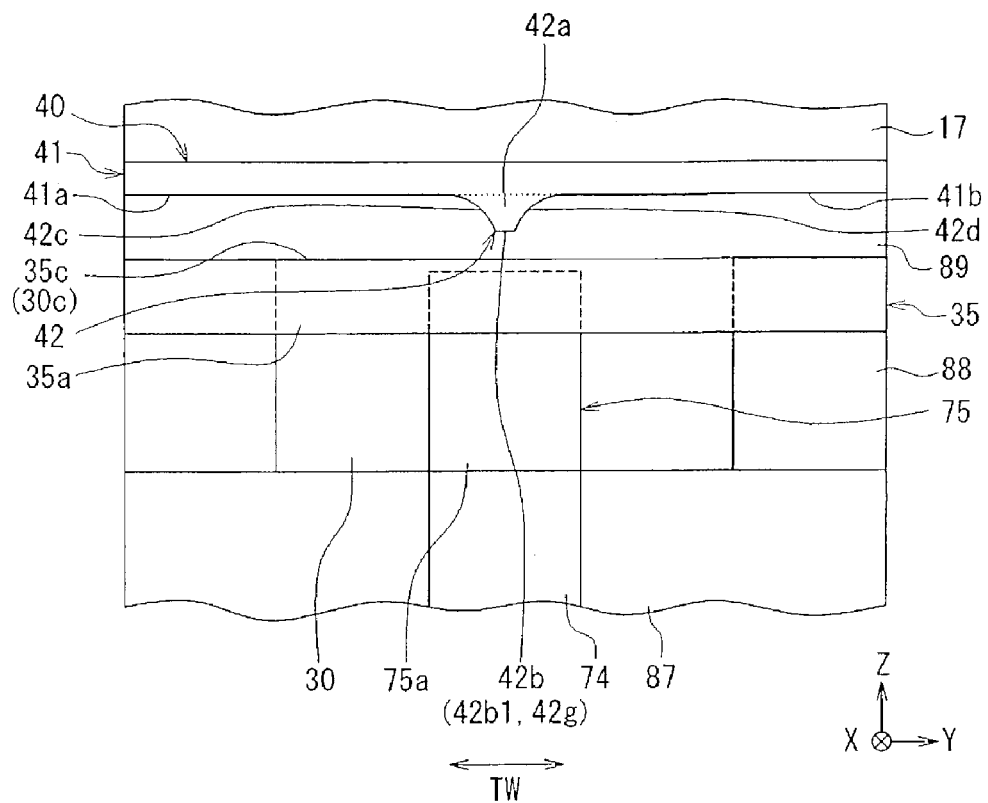
FIG. 17 is a front view showing the main part of the thermally-assisted magnetic recording head according to the second embodiment of the invention.
Figure 18:
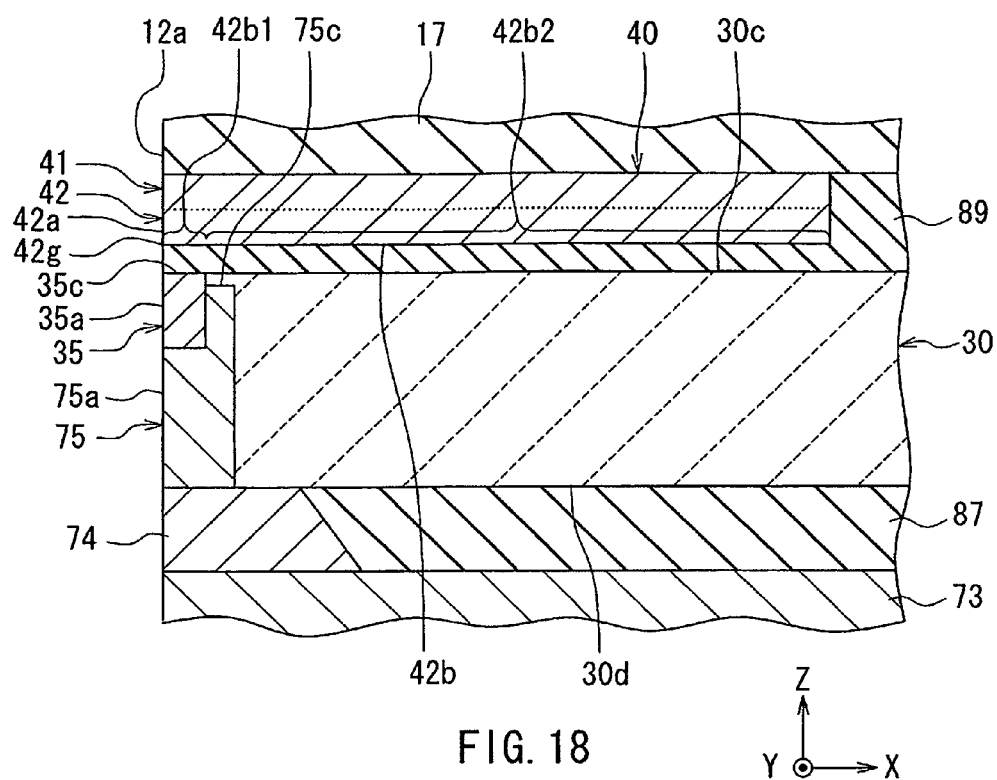
FIG. 18 is a cross-sectional view showing the main part of the thermally-assisted magnetic recording head according to the second embodiment of the invention.
Figure 19:
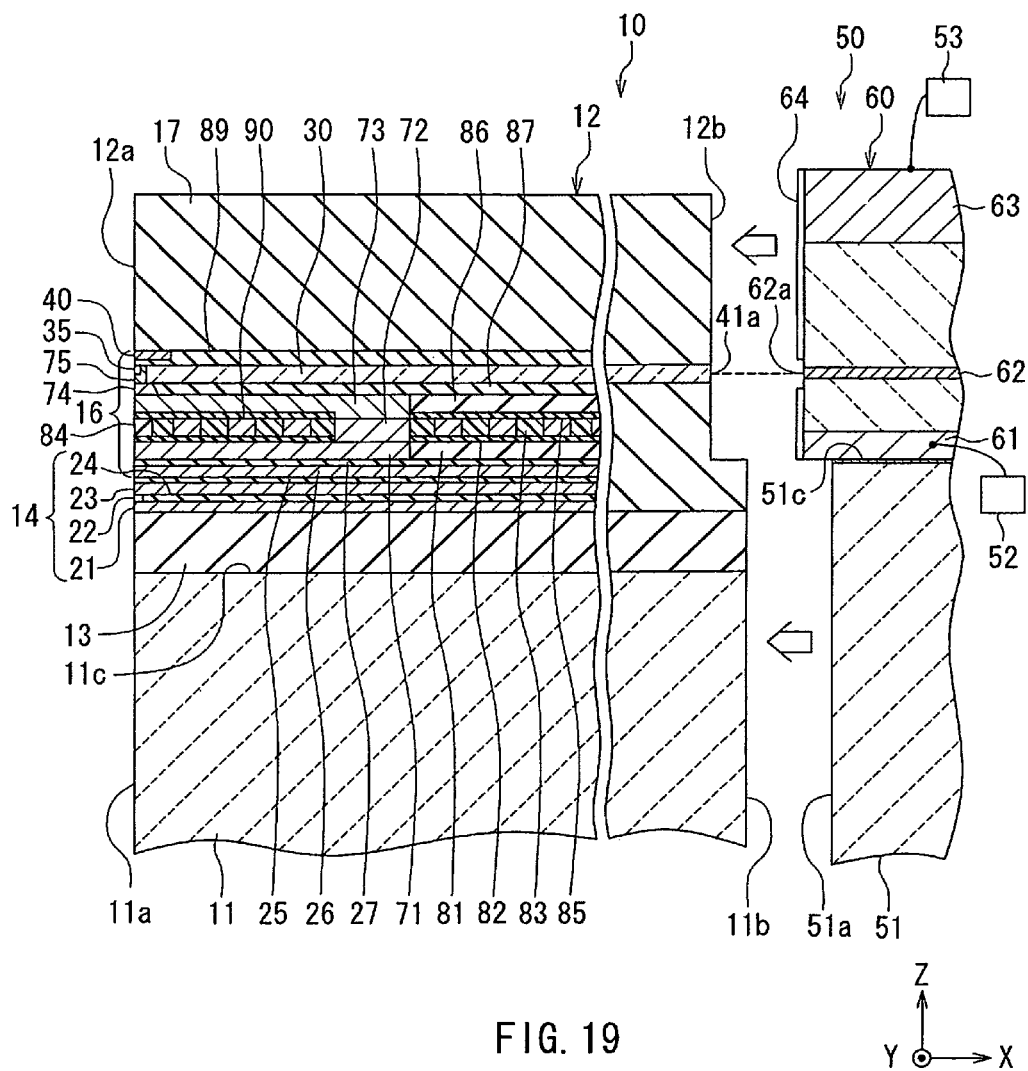
FIG. 19 is a cross-sectional view showing the thermally-assisted magnetic recording head according to the second embodiment of the invention.

Reference is now made to FIG. 16 to FIG. 18 to describe the shapes and the arrangement of the core 30, the metal layer 35, the plasmon generator 40, and the magnetic pole 75. FIG. 16 is a perspective view showing the main part of the thermally-assisted magnetic recording head 1. FIG. 17 is a front view showing the main part of the thermally-assisted magnetic recording head 1. FIG. 18 is a cross-sectional view showing the main part of the thermally-assisted magnetic recording head 1. Note that FIG. 17 shows part of the medium facing surface 12a. FIG. 18 shows a cross section perpendicular to the element-forming surface 11c and the medium facing surface 12a.

In the present embodiment, the magnetic pole 75 is embedded in the core 30 in the vicinity of the medium facing surface 12a. The magnetic pole 75 has an end face 75a located in the medium facing surface 12a, and has a top end face 75c. The top end face 75c may or may not be exposed in the evanescent light generating surface 30c. FIG. 18 shows the case where the top end face 75c is not exposed in the evanescent light generating surface 30c.

In the present embodiment, the core 30 and the magnetic pole 75 have a cut-out having the same shape as the cut-out 30g shown in FIG. 5. The metal layer 35 is disposed such that a portion thereof is accommodated in the cut-out. The top end face 35c of the metal layer 35 and the evanescent light generating surface 30c may be flush with each other or may have a difference in level therebetween.

The shapes and the positional relationship between the core 30, the metal layer 35, and the plasmon generator 40 in the present embodiment are the same as those in the first embodiment. In the present embodiment, the magnetic pole 75 and the metal layer 35 are located on the same side (the leading end side) in the first direction (the Z direction) relative to the plasmon generator 40. The end face 75a of the magnetic pole 75 is located backward along the Z direction, i.e., located on the leading end side, relative to the front end face 42a of the protruding part 42 of the plasmon generator 40.

The remainder of configuration, function and effects of the present embodiment are similar to those of the first embodiment.

Third Embodiment

Figure 20:
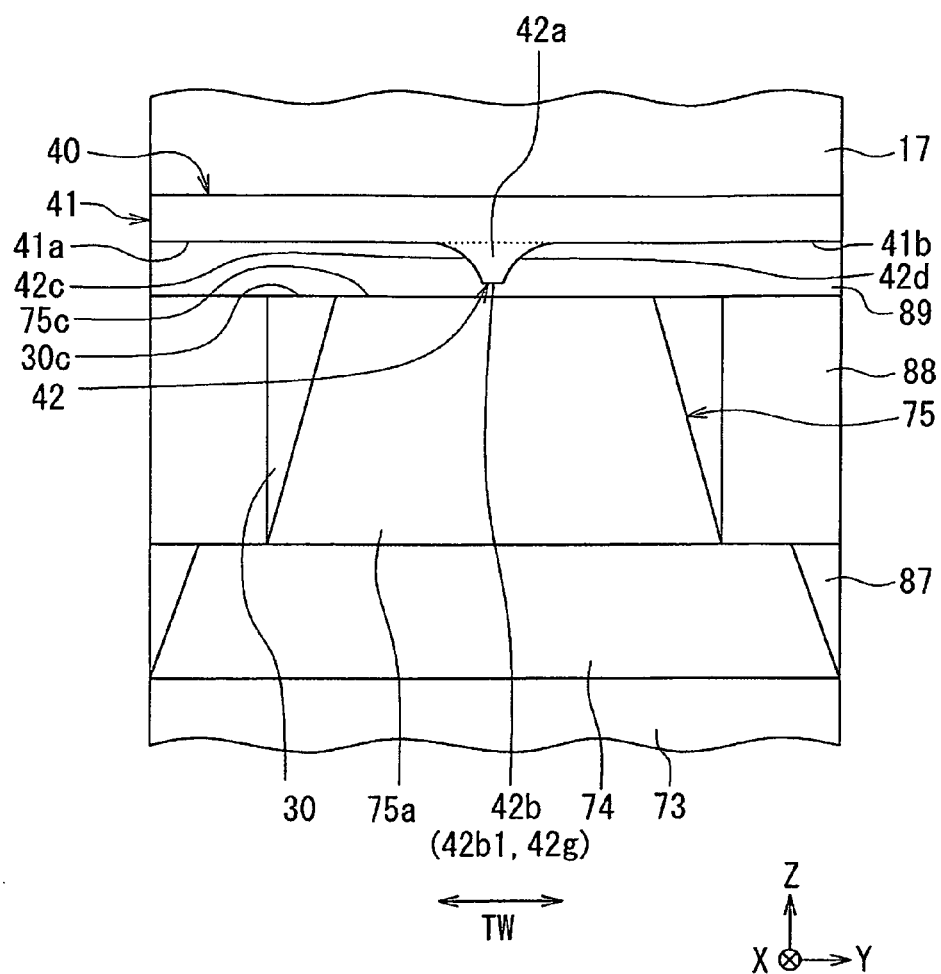
FIG. 20 is a front view showing the main part of a thermally-assisted magnetic recording head according to a third embodiment of the invention.
Figure 21:
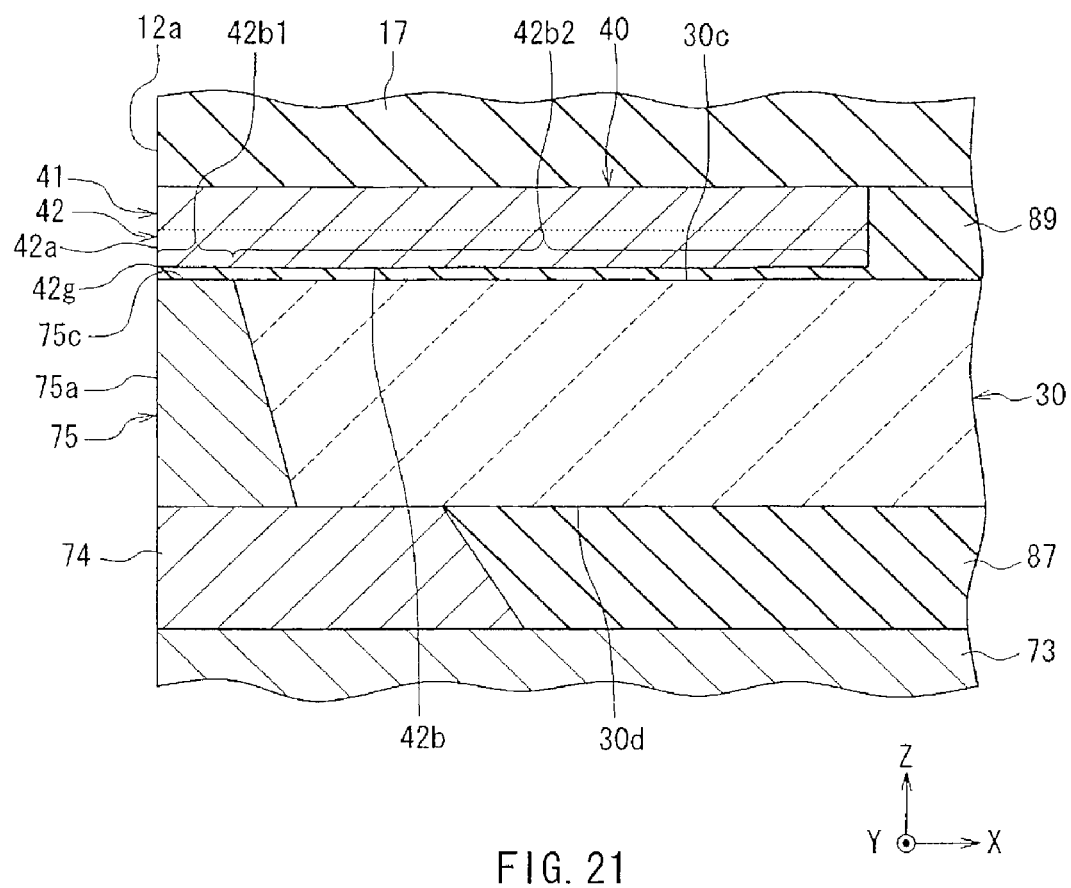
FIG. 21 is a cross-sectional view showing the main part of the thermally-assisted magnetic recording head according to the third embodiment of the invention.

A third embodiment of the invention will now be described with reference to FIG. 20 and FIG. 21. FIG. 20 is a front view showing the main part of the thermally-assisted magnetic recording head 1 according to the present embodiment. FIG. 21 is a cross-sectional view showing the main part of the thermally-assisted magnetic recording head 1 according to the present embodiment. Note that FIG. 21 shows a cross section perpendicular to the element-forming surface 11c and the medium facing surface 12a.

In the present embodiment, the metal layer 35 of the second embodiment is eliminated and the magnetic pole 75 made of a magnetic metal material also serves as the metal layer of the present invention. In the present embodiment, as shown in FIG. 21, no cut-out is formed in the core 30 and the magnetic pole 75. The top end face 75c of the magnetic pole 75 is exposed in the evanescent light generating surface 30c. The top end face 75c faces the first portion 42b1 of the flat surface 42b. The first portion 42b1 in the present embodiment is a portion of the flat surface 42b opposed to the top end face 75c of the magnetic pole 75. In the example shown in FIG. 20 and FIG. 21, the magnetic pole 75 has the shape of a truncated four-sided pyramid. However, the magnetic pole 75 may have other shapes such as a rectangular parallelepiped shape.

The remainder of configuration, function and effects of the present embodiment are similar to those of the second embodiment.

The present invention is not limited to the foregoing embodiments, and various modifications may be made thereto. For example, in the foregoing embodiments, the core 30 and the metal layer 35 (or the magnetic pole 75) are located backward along the Z direction (located on the leading end side) relative to the plasmon generator 40. In the present invention, however, the core and the metal layer may be located forward along the Z direction (located on the trailing end side) relative to the plasmon generator. In such a case, in the plasmon generator, the protruding part is formed to protrude upward from the top surface of the base part.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A near-field light generator comprising a waveguide, a plasmon generator, and a metal layer, wherein:
    the waveguide includes a core through which light propagates, and a cladding that surrounds the core;
    the core has an evanescent light generating surface that generates evanescent light based on the light propagating through the core;
    the core and the metal layer are located on the same side relative to the plasmon generator in a first direction perpendicular to the evanescent light generating surface;
    the plasmon generator includes a base part and a protruding part, the protruding part protruding from the base part toward the evanescent light generating surface;
    the base part has a first base surface and a second base surface that face toward the evanescent light generating surface and are located on opposite sides of the protruding part in a second direction parallel to the evanescent light generating surface, the first and second base surfaces being parallel to the evanescent light generating surface;
    the protruding part has: a front end face located at an end in a third direction orthogonal to the first and second directions; a flat surface that is shaped like a band and elongated in the third direction, the flat surface facing toward the evanescent light generating surface and being parallel to the evanescent light generating surface; and a first side surface and a second side surface that are at a distance from each other;
    the flat surface is located closer to the evanescent light generating surface than are the first and second base surfaces;
    the first side surface connects the flat surface to the first base surface;
    the second side surface connects the flat surface to the second base surface;
    in at least a portion of the protruding part, a distance between the first and second side surfaces in the second direction increases with increasing distance from the evanescent light generating surface;
    the front end face includes a near-field light generating part that generates near-field light;
    the flat surface includes a first portion contiguous with the front end face, and a second portion that is located farther from the front end face than is the first portion;
    the metal layer has an end face that faces the first portion of the flat surface;
    the evanescent light generating surface faces the second portion of the flat surface;
    a difference in level between the flat surface and each of the first and second base surfaces in the first direction falls within a range of 20 to 50 nm;
    the flat surface has a width in the second direction within a range of 5 to 35 nm; and
    the first portion of the flat surface and the end face of the metal layer are at a distance within a range of 10 to 40 nm from each other,
    the near-field light generator being configured so that a surface plasmon is excited on at least the second portion of the flat surface of the plasmon generator through coupling with the evanescent light generated from the evanescent light generating surface, the surface plasmon propagates along the flat surface to the near-field light generating part, and the near-field light generating part generates the near-field light based on the surface plasmon.

2. The near-field light generator according to claim 1, wherein each of the first and second side surfaces forms an angle with respect to the first direction, the angle increasing with increasing distance from the evanescent light generating surface.

3. A thermally-assisted magnetic recording head comprising:
 a medium facing surface that faces a magnetic recording medium;
 a magnetic pole that has an end face located in the medium facing surface and produces a write magnetic field for writing data on the magnetic recording medium; and
 the near-field light generator according to claim 1, wherein:
 the near-field light generating part is located in the medium facing surface; and
 the near-field light generator generates the near-field light to irradiate the magnetic recording medium when data is written on the magnetic recording medium using the write magnetic field.

4. The thermally-assisted magnetic recording head according to claim 3, wherein the magnetic pole is disposed such that the plasmon generator is interposed between the metal layer and the magnetic pole.

5. The thermally-assisted magnetic recording head according to claim 3, wherein the magnetic pole and the metal layer are located on the same side in the first direction relative to the plasmon generator.

6. The thermally-assisted magnetic recording head according to claim 3, wherein the magnetic pole also serves as the metal layer.

7. A head gimbal assembly comprising the thermally-assisted magnetic recording head according to claim 3, and a suspension that supports the thermally-assisted magnetic recording head.

8. A magnetic recording device comprising: a magnetic recording medium; the thermally-assisted magnetic recording head according to claim 3; and a positioning device that supports the thermally-assisted magnetic recording head and positions the thermally-assisted magnetic recording head with respect to the magnetic recording medium.

* * * * *